US012523959B2

(12) United States Patent
Akizuki et al.

(10) Patent No.: US 12,523,959 B2
(45) Date of Patent: Jan. 13, 2026

(54) IMAGE FORMING APPARATUS

(71) Applicant: CANON KABUSHIKI KAISHA, Tokyo (JP)

(72) Inventors: Tomoo Akizuki, Kanagawa (JP); Yusuke Shimizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/937,332

(22) Filed: Nov. 5, 2024

(65) Prior Publication Data

US 2025/0068109 A1 Feb. 27, 2025

Related U.S. Application Data

(62) Division of application No. 18/100,606, filed on Jan. 24, 2023, now Pat. No. 12,164,252.

(30) Foreign Application Priority Data

Feb. 3, 2022 (JP) ................................ 2022-015479

(51) Int. Cl.
*G03G 15/00* (2006.01)

(52) U.S. Cl.
CPC ................................ *G03G 15/5033* (2013.01)

(58) Field of Classification Search
CPC .................................................. G03G 15/5033
See application file for complete search history.

(56) References Cited

U.S. PATENT DOCUMENTS

| | | | |
|---|---|---|---|
| 4,827,306 | A | 5/1989 | Tsujimoto et al. |
| 5,485,248 | A | 1/1996 | Yano et al. |
| 11,435,675 | B2 | 9/2022 | Kanai et al. |
| 2013/0108290 | A1 | 5/2013 | Funatani et al. |
| 2014/0178086 | A1 | 6/2014 | Kitamura et al. |
| 2015/0042739 | A1 | 2/2015 | Seki |
| 2015/0286158 | A1 | 10/2015 | Ohta et al. |
| 2015/0286160 | A1 | 10/2015 | Akagi |
| 2016/0179029 | A1 | 6/2016 | Shibuya |
| 2020/0310275 | A1 | 10/2020 | Kanai et al. |

FOREIGN PATENT DOCUMENTS

| | | | |
|---|---|---|---|
| JP | H07-253693 | A | 10/1995 |
| JP | 2002-278231 | A | 9/2002 |
| JP | 2013-228491 | A | 11/2013 |
| JP | 2020-160361 | A | 10/2020 |

*Primary Examiner* — Sevan A Aydin
(74) *Attorney, Agent, or Firm* — VENABLE LLP

(57) ABSTRACT

An image forming apparatus includes a photosensitive member, a charging member, an exposing unit to expose a surface of the photosensitive member, and a developing member to supply toner with normal polarity at a developing portion. A controller, during a non-image formation when a toner image is not formed on a surface of the photosensitive member, controls such that a developing voltage is changed in a predetermined voltage width by applying a first developing voltage while the area of the photosensitive member on which a first surface potential is formed passes through the developing portion and by applying a second developing potential of an opposite polarity side rather than the first developing voltage while the area of the photosensitive member on which a second surface potential is formed passes through the developing portion, and the controller controls such that the surface potential becomes a side of the normal polarity rather than the first developing voltage.

3 Claims, 15 Drawing Sheets

IMAGE FORMING APPARATUS

This application is a divisional of application Ser. No. 18/100,606, filed Jan. 24, 2023.

FIELD OF THE INVENTION AND RELATED ART

The present invention relates to an image forming apparatus such as a laser printer, copier, FAX, etc., that uses the electrophotographic method.

In the past, image forming units using the electrophotographic method have been known to be equipped with a contact developing method developing unit. In the contact developing method, a developing roller is brought into contact with a photosensitive drum during image formation to develop a latent electrostatic image formed on a photosensitive drum to form an image. Some contact developing methods have a configuration in which the developing roller is separated from the photosensitive drum during the period from the start of pre-rotation before image formation to the start of the image forming operation, and during the period from the end of the image forming operation to the end of post-rotation after image formation. If a developing roller and photosensitive drum contacting and separating mechanism is provided, the image forming apparatus becomes more complicated and larger in size. Therefore, in recent years, a developing unit without a contact separation mechanism between the developing roller and photosensitive drum has been adopted in order to simplify and downsize the image forming apparatus.

In an image forming apparatus that is not equipped with a contacting and separating mechanism between the developing roller and photosensitive drum in the developing portion, which is the position where the photosensitive drum opposes the developing roller, the developing roller and photosensitive drum are in contact with each other at all times. Therefore, in the image forming unit without the contacting and separating mechanism between the developing roller and photosensitive drum, toner tends to be transferred from the developing roller to the non-image forming portion on the photosensitive drum where no electrostatic latent image is formed (hereinafter referred to as "blurring"), compared to the image forming unit equipped with the contacting and separating mechanism. Therefore, in image forming apparatuses that are not equipped with a contacting and separating mechanism between the developing roller and photosensitive drum in the developing portion, various techniques are required to prevent the occurrence of blurring.

For example, Japanese Laid-Open Patent Application No. 2020-160361 proposes a configuration in which the surface potential of the photosensitive drum is reduced to 0 V after the image forming operation is completed in an image forming unit that is not equipped with a contacting and separating mechanism between the developing roller and photosensitive drum in the developing portion. In other words, a positive voltage is applied to the developing roller after the surface potential of the photosensitive drum is set to 0 V when the photosensitive drum is rotating. As a result, the negatively charged toner on the developing roller is electrically held on the developing roller without transferring to the photosensitive drum, and even if the developing portion is not equipped with a contacting and separating mechanism between the developing roller and the photosensitive drum, the occurrence of blurring can be prevented when the pre-rotation operation starts.

For example, Japanese Laid-Open Patent Application No. 2020-160361 proposes a technique to maintain a constant potential difference between the surface potential of the photosensitive drum and the developing voltage by controlling the charging voltage, developing voltage, and laser beam quantity during the pre-rotation operation before image forming and the post-rotation operation after image forming. The potential difference between the surface potential of the photosensitive drum and the developing voltage is called back contrast (hereinafter referred to as Vback). In detail, the potential of the photosensitive drum is set to 0 V during the pre-rotation operation before image forming, and then control is performed to raise the surface potential of the photosensitive drum to a dark portion potential for image forming (hereinafter referred to as Vd) while maintaining Vback at a constant value. On the other hand, during the post-rotation operation after image forming is completed, control is performed to lower the surface potential of the photosensitive drum from Vd to 0 V while maintaining Vback at a constant value.

However, in the conventional control described above, during image forming, the surface potential of the photosensitive drum is rapidly lowered from Vd to the light portion potential for image forming (hereinafter referred to as V1). After the image forming operation is completed, during the post-rotation operation, which is performed during non-image forming time when no toner image is formed on the photosensitive drum, the surface potential of the image forming portion on the photosensitive drum is abruptly lowered from V1 to nearly 0V.

In this case, because the potential difference of the surface potential of the photosensitive drum drops at one time is large, it is difficult to adjust Vback to maintain it at a constant level, which causes blurring of the image.

In order to maintain a constant Vback, it is necessary to use a low laser light quantity to expose the surface of the photosensitive drum. However, if the laser light quantity is low, the beam detector (BD) installed in the exposure unit that emits the laser light, which detects the laser light and outputs a BD signal, may not be able to detect the laser light and may not output a BD signal. In the exposure unit, the scanner motor driving the rotation of the rotating polygonal mirror that deflects the laser beam to irradiate the laser beam onto the photosensitive drum is controlled based on the BD signal. Therefore, if the BD signal is not output normally, the scanner motor cannot be controlled to the target rotation speed, and as a result, the quantity of laser light exposed on the photosensitive drum becomes unstable and cannot be controlled to maintain the desired surface potential, which may cause blurring.

SUMMARY OF THE INVENTION

The present invention has been developed under these circumstances, with the aim of suppressing the occurrence of blurring during non-image formation when no toner image is formed on the photosensitive drum.

In order to solve the aforementioned issues, the present invention has the following configuration.

An image forming apparatus comprising: a rotatable photosensitive member; a charging member configured to charge a surface of the photosensitive member; an exposing unit configured to expose the surface of the photosensitive member charged by the charging member, the exposing unit including a light source configured to emit laser light to which the surface of the photosensitive member is exposed and a detecting portion configured to detect the laser light and output a detecting signal; a developing member configured to supply toner with normal polarity to the photosensitive member in a developing portion opposed to the photosensitive member and form a toner image; a charging voltage source configured to apply a charging voltage to the charging member; a developing voltage source configured to apply a developing voltage to the developing member; and a control portion configured to control the exposing unit, the charging voltage source and the developing voltage source and switch the laser light emitted from the light source, the charging voltage and the developing voltage, wherein the control portion, during a non-image formation when the toner image is not formed on the surface of the photosensitive member, controls the exposure unit and the developing voltage source such that a potential difference formed between an area of the photosensitive member of which a surface potential is changed and the developing voltage is maintained at a predetermined value by causing the light source to emit the laser light of which a quantity is detectable by the detecting portion and to expose the surface of the photosensitive member, wherein, in a case in which the control portion causes the surface potential of the photosensitive member formed on the area of the photosensitive member by the exposing unit to be changed from a first surface potential to a second surface potential of an opposite polarity side to the normal polarity rather than the first surface potential, the control portion controls the developing voltage source such that the developing voltage is changed in a predetermined voltage width by applying the first developing voltage while the area of the photosensitive member on which the first surface potential is formed passes through the developing portion and by applying a second developing potential of the opposite polarity side polarity rather than the first developing voltage while the area of the photosensitive member on which the second surface potential is formed passes through the developing portion, and the control portion controls such that the surface potential becomes a side of the normal polarity rather than the first developing voltage.

Further features of the present invention will become apparent from the following description of exemplary embodiments with reference to the attached drawings.

DESCRIPTION OF THE EMBODIMENTS

The following is a detailed description of the present invention with reference to the drawings.

[Image Forming Apparatus]

Figure 1:
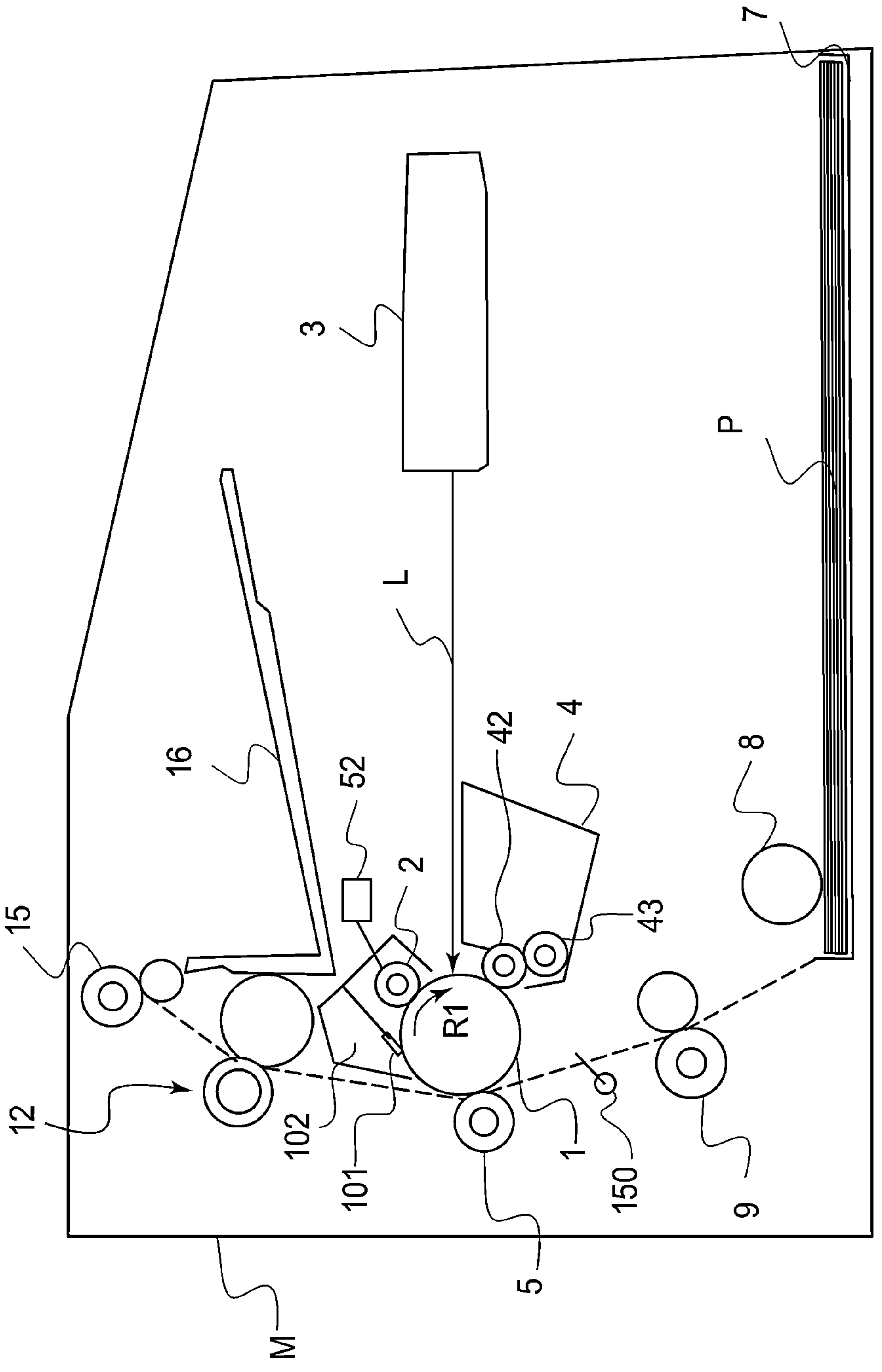
FIG. 1 shows a schematic cross-sectional view of the image forming apparatus according to embodiments 1 through 6.

FIG. 1 is a schematic cross-sectional view of an image forming apparatus M to which the present invention is applied.

The present embodiment of the image forming apparatus M is an electrophotographic monochrome laser printer. A photosensitive member, photosensitive drum 1, is rotatably supported by the main body of the image forming apparatus M and is driven by a driving motor (not shown) at a process speed (circumferential speed) of 250 mm/sec in the arrow direction (clockwise direction) indicated by R1 in the Figure. Around the photosensitive drum 1, a charging roller 2, an exposure unit 3, a developing unit 4, and a cleaning blade 101 are located along the rotation direction of the photosensitive drum 1. The charging roller 2, which is a charging member, is connected to a charging voltage power source 52 that applies a high voltage to the charging roller 2 and charges the surface of the photosensitive drum 1 to a uniform potential. The exposure unit 3, which is the exposure means, irradiates a laser beam L onto the surface of the photosensitive drum 1 according to image data to form an electrostatic latent image on the surface of the photosensitive drum 1. The developing unit 4, which is the developing means, has a developing roller 42 in contact with the photosensitive drum 1. A toner image, which is a visible image, is formed by adhering toner from the developing roller 42 to the electrostatic latent image formed on the photosensitive drum 1 (on the photosensitive member). The toner image formed on the photosensitive drum 1 moves toward the transfer nip portion where the photosensitive drum 1 and a transfer roller 5, which is the transfer means, are in contact with each other.

In the lower part of the image forming apparatus M, a cassette 7 accommodating paper P, which is a recording material, is located. During image formation, paper P is fed one sheet at a time from the cassette 7 by a feeding roller 8, and the paper P fed by the feeding roller 8 is fed to the transfer roller 5 by a feeding roller 9. In the feeding path between the feeding roller 9 and the transfer roller 5, a TOP sensor 150 is located to detect the paper P. When the TOP sensor 150 detects the leading end of the fed paper P, it outputs a TOP signal 210 (see FIG. 3) to an engine control portion 205 (see FIG. 3), which is described later. When the TOP signal 210 is input, the engine control portion 205 starts the image forming operation on the photosensitive drum 1 as described above.

The paper P fed from the cassette 7 is fed to the transfer nip portion where the photosensitive drum 1 and the transfer roller 5 contact each other. In the transfer nip portion, a high voltage is applied to the transfer roller 5 from a high voltage power source (not shown), and the toner image formed on the photosensitive drum 1 is transferred onto the paper P. The toner remaining on the photosensitive drum 1 without being transferred to the paper P is removed by the cleaning blade 101, and the removed toner is collected in the waste toner container 102.

The paper P that has passed through the transfer nip portion is fed to a fixing unit 12. In the fixing unit 12, the toner image transferred on the paper P is fixed to the paper P by heating and pressurizing. The paper P on which the toner image has been fixed by the fixing unit 12 is discharged by the discharge roller 15 to the discharge tray 16 provided at the top of the image forming apparatus M, and is stacked.

[Developing Unit]

Figure 2:
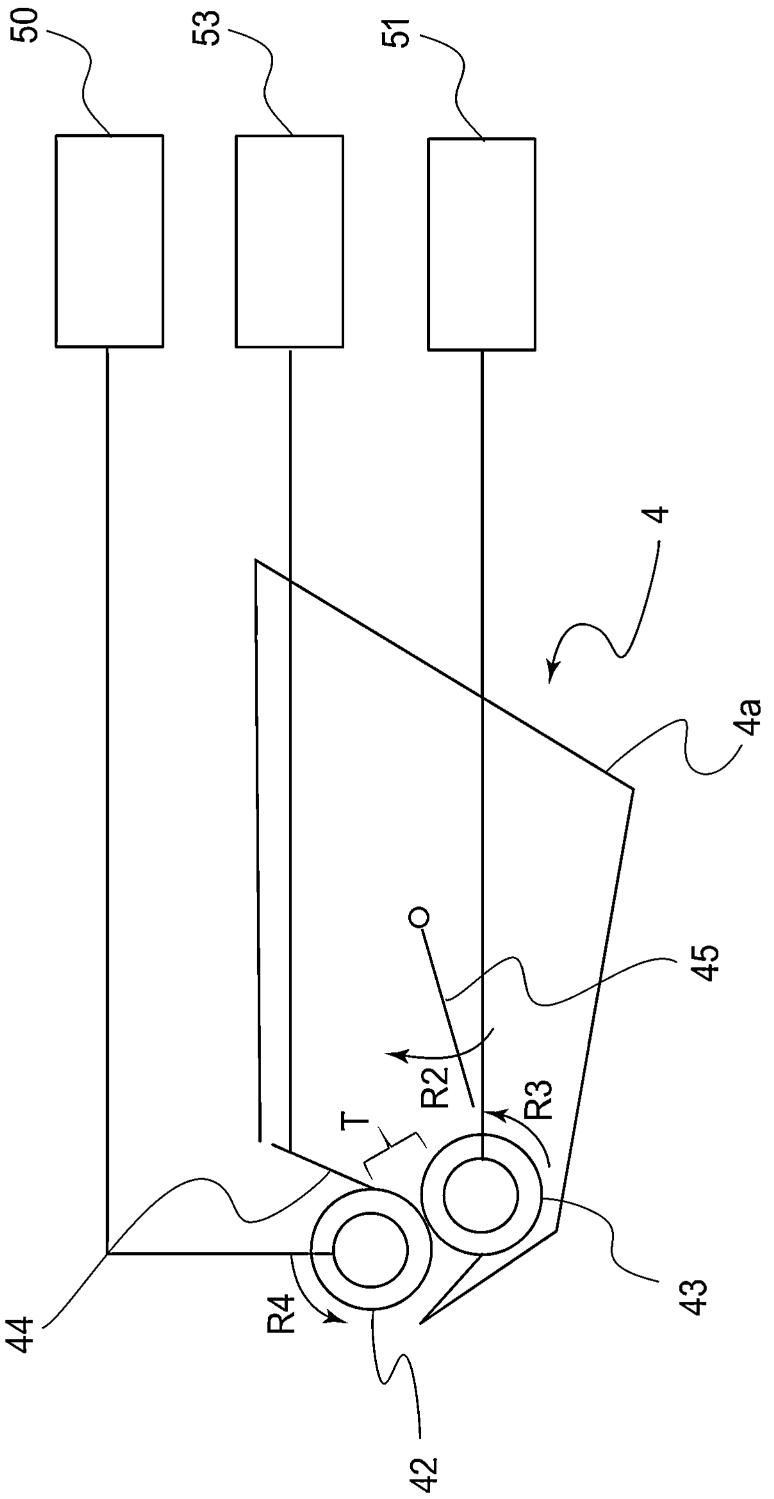
FIG. 2 is a cross-sectional view showing the schematic configuration of the developing units according to embodiments 1 through 6.

FIG. 2 is a schematic cross-sectional view of the developing unit 4 shown in FIG. 1. As shown in FIG. 2, the developing unit 4 has a developing roller 42 as a developing member, a developer supplying roller 43 that contacts the developing roller 42 and supplies developer, and a developing blade 44 as a developer regulating member. At the center of the toner container 4*a* of the developing unit 4 is a stirring rod 45, which is a stirring member for stirring the toner (developer). A developing voltage power source 50 is connected to the developing roller 42 to apply a developing voltage to the developing roller 42, and a supply voltage power source 51 is connected to the developer supplying roller 43. The developing unit 4 in the present embodiment is not provided with a contacting and separating mechanism that switches the state of contacting and separating between the photosensitive drum 1 and the developing roller 42.

Next, the operation of the present embodiment of the developing unit 4 is described. In the developing unit 4, the stirring rod 45 rotates in the arrow direction (clockwise direction) indicated by R2 in the Figure, and toner (not shown) is temporarily stored in an area T in the vicinity of the contacting portion between the developing roller 42 and the toner supplying roller 43. The toner stored in the area T is supplied to be carried on the developing roller 42 by the developer supplying roller 43 rotating in the arrow direction (counterclockwise direction) indicated by R3 in the Figure. The toner supplying roller 42 is thinned (coated) with an appropriate layer thickness by the developing blade 44 (regulating member) as the developing roller 42 rotates in the arrow direction (counterclockwise direction) indicated by R4 in the Figure. The developing blade 44 is connected to a developing blade voltage power source 53 that applies a developing blade voltage to the developing blade 44. In the present embodiment, the voltage is applied between the developing roller 42 and the developer supplying roller 43 so that a potential difference of 100 V is generated to supply toner of the normal polarity to the developing roller 42 side. Also, between the developing roller 42 and the developing blade 44, voltage is applied so that a potential difference of 100 V is generated so that toner of the normal polarity does not adhere to the developing blade 44 and an electric charge can be given to the toner loaded on the developing roller 42.

The toner supplying roller 42 is frictionally charged with negative polarity by sliding against the surface of the developing blade 44. The toner coated on the developing roller 42 is then fed to the developing nip portion (not shown) (also called the developing portion) where the developing roller 42 contacts the photosensitive drum 1 by rotating the developing roller 42 in the arrow direction (counterclockwise direction) indicated by R4 in the Figure. In the developing nip portion, a portion of the toner coated on the developing roller 42 is transferred to the photosensitive drum 1 by the potential of the electrostatic latent image formed on the photosensitive drum 1 by the exposure unit 3 and the electric field formed by the developing voltage applied to the developing roller 42 from the developing voltage power source 50. In this way, the electrostatic latent image formed on the photosensitive drum 1 is developed (visualized) as a toner image. The toner that does not transfer to the photosensitive drum 1 in the developing nip portion and remains on the developing roller 42 is stripped off by the developer supplying roller 43 in the contacting portion between the developing roller 42 and the developer supplying roller 43, and the developer roller 42 is newly supplied with toner stored in the area T.

In the developing unit 4, a developing voltage is applied to the developing roller 42, which carries toner, from the developing voltage power source 50. Even in a non-image forming area on the photosensitive drum 1 where no electrostatic latent image is formed, it is necessary to apply a developing voltage to the developing roller 42 in order to suppress blurring, which is the transfer of toner from the developing roller 42. Here, "blurring" refers to a phenomenon in which toner (blurring toner) adheres to a non-image portion (non-image forming area) where no electrostatic latent image is formed on the surface of the photosensitive drum 1 and no image is formed. Blurring is affected by the back contrast (hereinafter referred to as Vback), which is the difference in potential between the potential of the surface of the photosensitive drum 1 developing portion opposing roller 42 and the developing voltage of the developing roller 42. Therefore, it is necessary to control Vback so that it becomes an appropriate potential difference in order to suppress blurring.

For example, if Vback is small, the electric field that keeps the toner charged with negative polarity, which is the normal charging polarity in the present embodiment, on the developing roller 42 weakens, causing the toner to transfer onto the photosensitive drum 1, resulting in the generation of blurred toner on the non-image portions on the photosensitive drum 1. On the other hand, when Vback is large, the potential difference between the photosensitive drum 1 and the developing roller 42 is large. Therefore, while the force that electrically attracts toner of negative polarity, which is the normal polarity side, in the direction of the developing roller 42 is strong, toner charged with positive polarity, which is the opposite polarity side of the normal polarity, adheres to the non-image forming portion on the photosensitive drum 1, causing blurring.

If the toner is applied during image forming, the toner adheres to areas other than the intended image forming portion, causing the blank areas (non-image portions) of the paper P to become tinted, which results in image defects. On the other hand, if blurring occurs outside of image formation, the blurred toner is scraped off by the cleaning blade 101 and collected in the waste toner container 102, resulting in wasteful consumption of toner. Therefore, in the present embodiment, Vback is set to a predetermined value of 150 V (150 volts) to minimize the amount of blurred toner.

[Exposure Unit]

Figure 3:
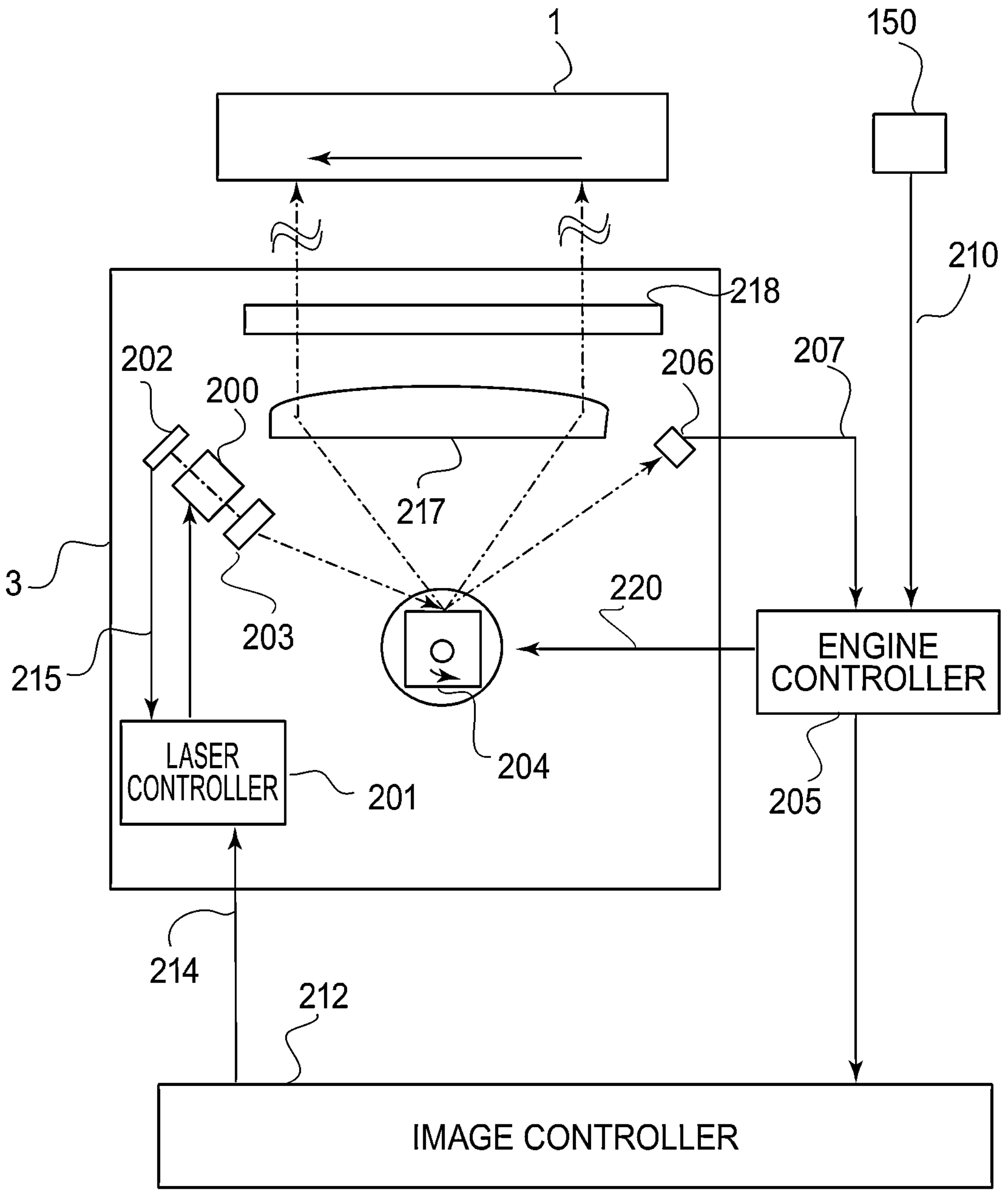
FIG. 3 is a view showing the configuration of the exposure units according to embodiments 1 through 6.

FIG. 3 explains the exposure unit 3 and the control portions that control the exposure unit 3. The exposure unit 3 is controlled by the engine control portion 205 and the image control portion 212. In the present embodiment, the engine control portion 205 and the image control portion 212 are located on different control plates.

The exposure unit 3 is equipped with a laser light source 200, a collimator lens 203, a rotating polygonal mirror 204, a photodiode (PD) 202, a beam detector (BD) 206, an f-θ lens 217, and a reflection mirror 218. The exposure unit 3 is also equipped with a laser control unit 201 that controls the emission of the laser light source 200 in response to the video signal 214 output from the image control unit 212. The laser light source 200 has a light emitting element and emits laser light in two directions. One of the two laser beams emitted from the laser light source 200 is incident on the photodiode 202. The photodiode 202 converts the incident laser light into an electrical signal and outputs it as a PD signal 215 to the laser control portion 201. Based on the input PD signal 215, the laser control portion 201 controls the output light quantity of the laser light source 200 (APC: Auto Power Control) so that the laser light emitted from the laser light source 200 becomes a predetermined light quantity.

The other laser beam emitted from the laser source 200 enters the rotating polygonal mirror 204 through the collimator lens 203. The rotating polygonal mirror 204 has a plurality of reflecting surfaces and is driven in the arrow direction (counterclockwise) in the figure by a scanner motor (not shown). The present embodiment of the rotating polygonal mirror 204 has four reflective surfaces. The scanner motor drives the rotating polygonal mirror 204 in accordance with the driving signal 220 output from the engine control portion 205. The laser beam incident on the rotating polygonal mirror 204 is deflected in the optical path toward the photosensitive drum 1 by the reflecting surfaces of the rotating polygonal mirror 204. The rotation of the rotating polygonal mirror 204 driven by the scanner motor changes the deflection angle of the laser beam, and the deflected laser beam scans over the photosensitive drum 1 in the arrow direction in the figure. The laser beam is corrected by the f-θ lens 217 so that it scans over the photosensitive drum 1 at a constant speed, and is irradiated onto the photosensitive drum 1 through the reflection mirror 218.

The BD 206, the detection unit in the present embodiment, is located at a position where the laser beam can be detected before the laser beam starts scanning a portion of photosensitive drum 1. The laser beam deflected by the rotating polygonal mirror 204 is received by the BD 206 before it scans the photosensitive drum 1. When the BD 206 detects the laser beam, it outputs a BD signal 207, which is a detection signal, to the engine control portion 205. The BD signal 207 is a negative logic signal, for example, and is at the first level (Low level) while the BD 206 detects the laser beam and at the second level (High level) while the BD 206 does not detect the laser beam.

The engine control portion 205 calculates the period of the BD signal 207 based on the BD signal 207 output from the BD 206 and controls the rotation of the scanner motor by outputting a driving signal 220 so that the rotation period of the rotating polygonal mirror 204 indicated by the period of the BD signal 207 becomes the predetermined period. The engine control portion 205 judges that the rotation period of the rotating polygonal mirror 204 driven by the scanner motor is stable at the predetermined period when the period at which the BD signal 207 is output becomes the predetermined period. In other words, the engine control portion 205 performs feedback control so that the rotation of the rotating polygonal mirror 204 is stabilized at the predetermined period by adjusting the rotation of the scanner motor with the driving signal 220 based on the BD signal 207.

[Print Sequence]

Figure 4:
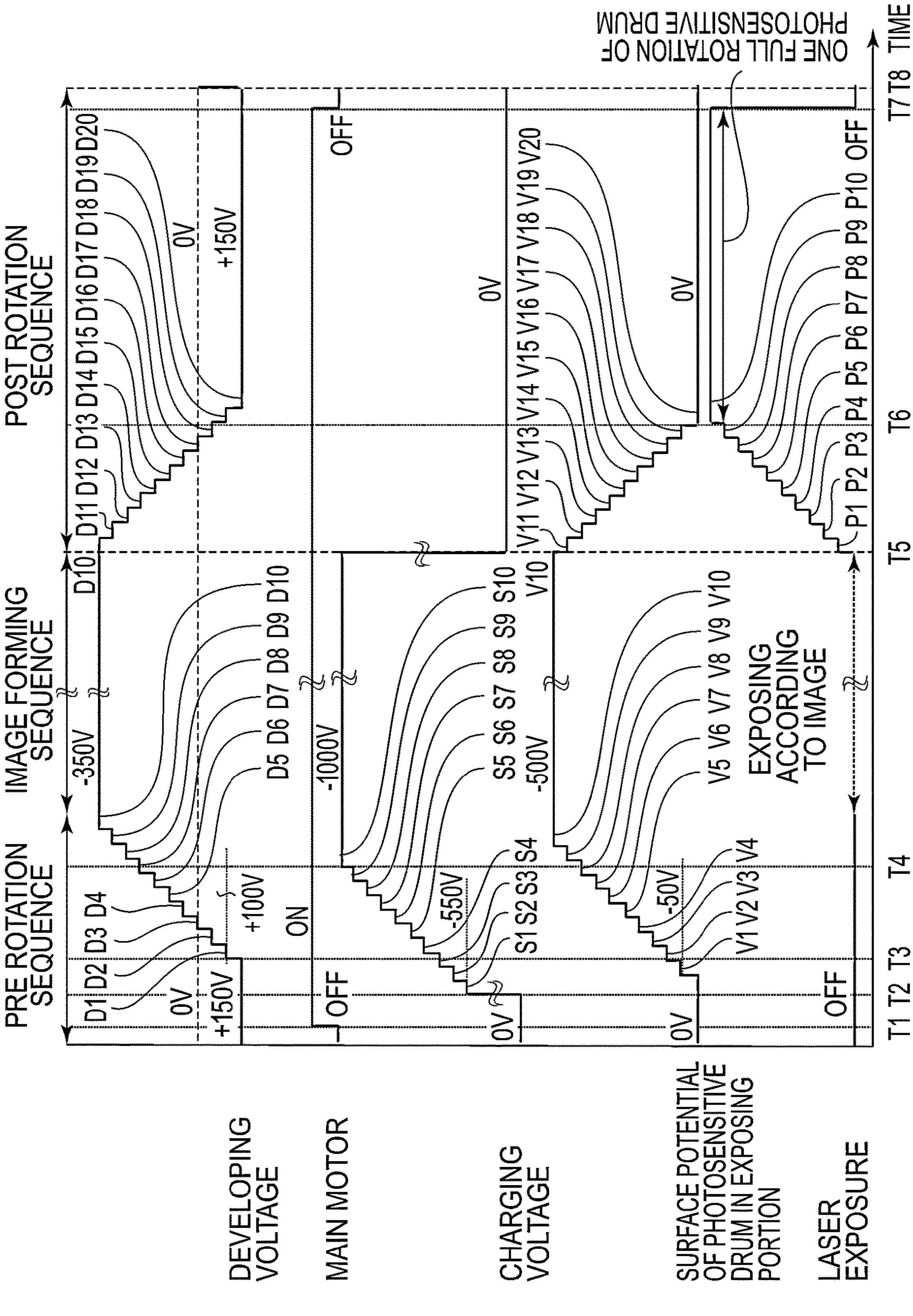
FIG. 4 is a timing chart showing the print sequence according to embodiment 1.

The print sequence, which is the control sequence for image forming control on paper P in the present embodiment, is described. FIG. 4 is a timing chart that explains the relationship between the various high voltages (developing voltage and charging voltage), the main motor driving each roller, the surface potential of the photosensitive drum 1, and the quantity of laser light irradiated from the exposure unit 3 that exposes the photosensitive drum 1 in the print sequence. In FIG. 4, the horizontal axis indicates time, and T1 to T8 indicate timing (time).

As shown in FIG. 4, the print sequence consists of a "pre-rotation sequence," an "image forming sequence," and a "post-rotation sequence." In the "pre-rotation sequence," the surface potential of the photosensitive drum 1 is raised from 0 V to the dark portion potential Vd, which is the surface potential for image forming (hereinafter referred to as "pre-rotation") in order to perform image forming control. In the "image forming sequence," after the surface potential of the photosensitive drum 1 is raised to the dark portion potential Vd, laser exposure corresponding to the image data is performed on a part of the surface of the photosensitive drum 1. An electrostatic latent image is formed on the surface of the photosensitive drum 1 where the laser exposure was performed, and the surface potential of the photosensitive drum 1 in the portion where the electrostatic latent image was formed decreases to the light portion potential V1, which is the surface potential of the photosensitive drum 1 for the image forming portion. In the "post-rotation sequence," the surface potential of the photosensitive drum 1 is controlled to fall from the dark portion potential Vd to 0 V after the image forming sequence is completed (hereinafter referred to as "post-rotation"). In the present embodiment, the dark portion potential Vd is −500 V and the light portion potential V1 is −250 V.

(Pre-Rotation Sequence)

Next, the control in the pre-rotation sequence is explained in detail. When the engine control portion 205 receives a print signal from the host computer (not shown) requesting the image forming portion on paper P, a developing voltage is applied to the developing roller 42 from the developing voltage power source 50. As mentioned above, in the present embodiment, the surface potential of the photosensitive drum 1 is lowered to 0 V during the post-rotation operation after the previous image formation is completed. Therefore, when the main motor driving rotation of the photosensitive drum 1 is started, the developing voltage power source 50 applies +150 V to the developing roller 42 as a positive developing voltage value in order to maintain Vback at 150 V. Note that high voltage power sources (e.g., developing voltage power source 50 and charging voltage power source 52) require time for the output voltage to transition to the target voltage.

At timing T1, when the developing voltage value applied to the developing roller 42 by the developing voltage power source 50 rises to +150 V and the rising of the developing voltage is completed, the main motor is started (turned ON) and the photosensitive drum 1 is driven in rotation by the main motor. The rotation speed of the main motor is controlled to reach a predetermined rotation speed based on the BD signal 207. It takes some time for the main motor speed to rise to the target speed and for the start-up process of the main motor to be completed.

At timing T2, when the main motor is finished starting up, the charging voltage power source 52 applies a first charging voltage S1 (−550 V) to the charging roller 2. As shown in FIG. 4, following the first charging voltage S1, the charging voltage is start-up controlled in a stepwise manner from S1 to S10, with a voltage fluctuation range of 50 V (50 volts) every 30 ms (milliseconds). In the present embodiment, at the start of the first start-up control (timing T2), the first charging voltage S1 (−550 V) is applied to the charging roller 2. Then, at the start of the tenth start-up control (timing T4), the tenth charging voltage S10 (−1,000 V) is applied to the charging roller 2. Thus, in the start-up control of the charging voltage, control is performed so that the variation width of the charging voltage per step is 50 V.

Next, the surface potential of the photosensitive drum 1 at the exposure area where the laser beam is irradiated is explained. As described above, the surface potential of the photosensitive drum 1 is maintained at 0 V until the timing T2 when the first charging voltage S1 is started to be applied to the charging roller 2. After the start-up control of the charging voltage is started and the charging voltage is applied to the charging roller 2, the surface potential of the photosensitive drum 1 increases in steps from potential V1 to V10, corresponding to the charging voltages S1 to S10. In the present embodiment, the surface potential of the photosensitive drum 1 is potential V1 (−50V) at the end of the first start-up control of the charging voltage, and potential V10 (−500V) at the end of the tenth start-up control of the charging voltage.

Thus, the start-up control of the surface potential of the photosensitive drum 1 is performed so that the variation range of the surface potential per step is 50V. In the present embodiment, the surface potential of the photosensitive drum 1 is formed by the discharge based on Paschen's law accompanying the application of the charging voltage.

On the other hand, the developing voltage is controlled so that Vback is maintained at 150 V at the developing nip portion where the photosensitive drum 1 and the developing roller 42 contact. In the present embodiment, at timing T3, when the start-up control of the developing voltage is initiated, the developing voltage is voltage D1 (+100V), and at the end of the start-up control, the voltage is D10 (−350V). Therefore, the start-up control of the developing voltage is performed so that the voltage fluctuation range per step is 50 V. In this way, Vback can be maintained at 150V by controlling the start-up of the developing voltage, the charging voltage, and the surface potential of the photosensitive drum in a stepwise manner. As a result, the toner on the developing roller 42 can be transferred onto the photosensitive drum 1, thereby suppressing the occurrence of blurring.

(Image Forming Sequence)

In the present embodiment, the surface potential of the photosensitive drum 1 is set to the optimal potential Vd (−500 V) for image formation during image formation as described above. Therefore, a charging voltage of −1,000 V is applied to the charging roller 2 from the charging voltage power source 52 during image formation. Meanwhile, a developing voltage of −350 V is applied to the developing roller 42 from the developing voltage power source 50. As a result, Vback, which in the present embodiment is the potential difference between the developing voltage and the surface potential of the photosensitive drum 1, is maintained at 150 V as in the pre-rotation sequence.

During image formation, the engine control portion 205 calculates the number of rotations of the rotating polygonal mirror 204 based on the period of the BD signal 207 output from the BD 206. Based on the calculated number of rotations of the rotating polygonal mirror 204, the engine control portion 205 outputs a driving signal 220 that controls the rotation of the scanner motor driving the rotating polygonal mirror 204 so that the number of rotations of the rotating polygonal mirror 204 becomes the specified number of rotations. In this way, the engine control portion 205 feedback controls the rotation speed of the rotating polygonal mirror 204 based on the BD signal 207.

On the other hand, when the engine control portion 205 receives a print signal requesting image formation on paper P from the host computer (not shown), it rotates and drives the feeding roller 8 after a predetermined time has elapsed, and starts the feeding operation of the paper P. The paper P fed from the cassette 7 by the feeding roller 8 is fed along the feeding path to the feeding roller 9, which feeds the paper P to the transfer roller 5. The TOP sensor 150, which is installed in the feeding path between the feeding roller 9 and the transfer roller 5 and detects the feeding paper P, outputs a TOP signal 210 to the engine control portion 205 when it detects the leading end of the paper P in the feeding direction. Furthermore, the TOP signal 210 is transmitted to the image control portion 212 via the engine control portion 205.

When the image control portion 212 acquires image data for image forming portion transmitted from the host computer (not shown), it converts the image data into a video signal 214 after performing appropriate image processing. The image control unit 212 then synchronizes the video signal 214 with the TOP signal 210 and BD signal 207 described above before sending it to the laser control portion 201 of the exposure unit 3. By synchronizing the TOP signal 210 and sending the video signal 214 to the laser control portion 201, the image forming portion and the position in the sub-scanning portion, which is the feeding direction of the paper feeding portion, are synchronized by the image control portion 212. On the other hand, the image control portion 212 synchronizes the image forming portion and the position in the main scanning direction, which is the direction orthogonal to the feeding direction of the paper portion P, by synchronizing the BD signal 207 and sending the video signal 214 to the laser control portion 201.

The laser control unit 201 of the exposure unit 3 controls the laser light source 200 to the on or off state according to the video signal 214 transmitted from the image control unit 212. As described above, the surface potential of the photosensitive drum 1 is controlled at −500 V until exposure by the laser beam from the laser light source 200, but the surface potential of the photosensitive drum 1 in the area where the electrostatic latent image is formed after exposure by the laser beam is −250 V. When the portion of the photosensitive drum 1 on which the electrostatic latent image is formed passes through the developing nip portion, which is the contacting portion with the developing roller 42, toner is electrically transferred from the surface of the photosensitive drum 1 to the surface of the developing roller 42. As a result, the toner adheres to the electrostatic latent image on the photosensitive drum 1, forming a toner image.

(Post-Rotation Sequence)

Next, the control in the post-rotation sequence is described. The present invention is characterized by the post-rotation sequence. As shown in FIG. 4, the post-rotation sequence starts at timing T5, which is a non-image forming timing when image formation on paper P in the image forming sequence described above has been completed. At timing T5, the charging voltage power source 52 stops applying the tenth charging voltage S10 (−1,000 V) to the charging roller 2, and the charging voltage is set to 0 V, a predetermined potential. Then, the laser control portion 201 of the exposure unit 3 controls the laser light source 200 to start emitting the laser beam and perform the first exposure to expose the surface of the photosensitive drum 1 with a first exposure quantity P1.

By performing the first exposure, the surface potential of the photosensitive drum 1 at the exposed area where the laser beam is irradiated is lowered by 50 V, a predetermined voltage range, from V10 (−500 V), the first surface potential, to V11 (−450 V), the second surface potential.

After the first exposure is completed, a second exposure is performed to expose the surface of the photosensitive drum 1 with a second exposure quantity P2, which is larger than the first exposure quantity P1. As a result, the surface potential of the photosensitive drum 1 is lowered by 50 V from V11 (−450 V) to V12 (−400 V). In the same way, the control of the surface potential of the photosensitive drum 1 is performed in the following steps: the third exposure by the third exposure quantity P3, the fourth exposure by the fourth exposure quantity P4, the fifth exposure by the fifth exposure quantity P5, and the sixth exposure by the sixth exposure quantity P6, in order to lower the surface potential of the photosensitive drum 1 in steps. As a result, the surface potential of the photosensitive drum 1 is lowered by 50 V in steps of V13 (−350 V), V14 (−300 V), V15 (−250 V), and V16 (−200 V).

Furthermore, the surface potential of the photosensitive drum 1 is controlled to stand down by the seventh exposure quantity P7, the eighth exposure quantity P8, the ninth exposure quantity P9, and the tenth exposure quantity P10. As a result, the surface potential of the photosensitive drum 1 is lowered by 50V to V17 (−150V), V18 (−100V), V19 (−50V), and V20 (0V), and then to 0V, the predetermined surface potential. The tenth exposure is performed for the time equivalent to one revolution of the photosensitive drum from timing T6 to timing T7. In other words, the 10th exposure, which is the last exposure, is continued until the surface potential of the photosensitive drum 1 reaches V20 (0 V) in all cycles. In this case, the 10th exposure is continued until the photosensitive drum 1 has completed one cycle, but it may be continued beyond one cycle.

On the other hand, as in the pre-rotation sequence, the developing voltage is controlled to fall in a stepwise manner so that Vback, which is the potential difference between the surface of the photosensitive drum 1 and the developing voltage, is maintained at 150 V at the position of the developing nip portion where the photosensitive drum 1 opposes the developing roller 42. In other words, in the control of lowering the developing voltage, the first developing voltage, D11 (−300V), the second developing voltage, D12 (−250V), D13 (−200V), . . . , and the predetermined developing voltage, D20 (+150V) is applied to the developing roller 42. This way, the developing voltage is controlled to be lowered so that the voltage fluctuation range per step is 50 V (50 volts).

The main motor is then stopped (turned off) at timing T7, when the tenth exposure, the last exposure, is completed. The developing voltage power source 50 stops applying the developing voltage D20 (+150 V) to the developing roller 42 at timing T8 when the main motor completely stops rotating due to inertia.

[The Relationship Between the Surface Potential of the Photosensitive Drum and the Laser Exposure Dose]

Figure 5:
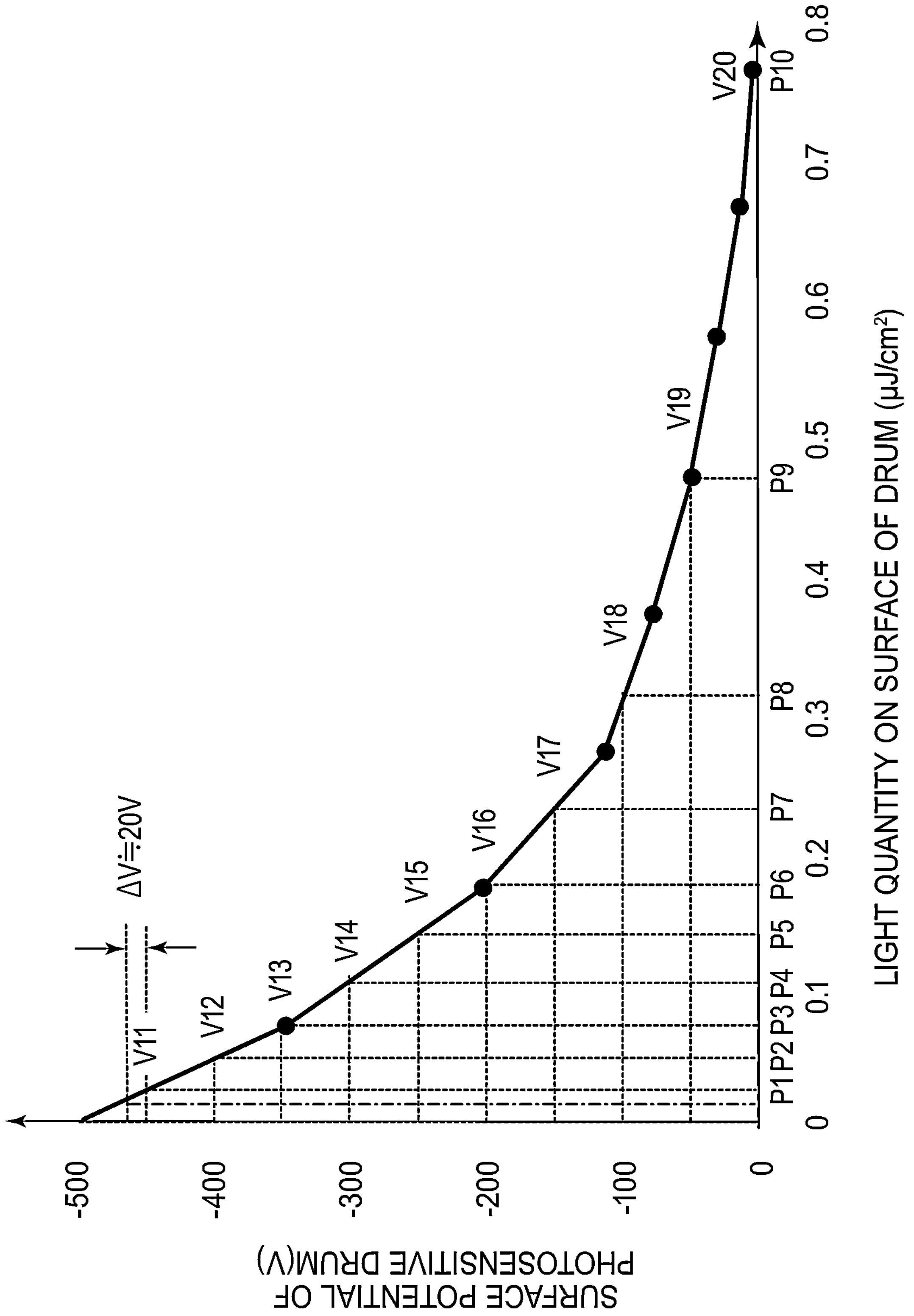
FIG. 5 is a graph showing the relationship between the quantity of laser exposure and the surface of the photosensitive drum according to embodiment 1.

FIG. 5 is a graph showing the relationship between the surface potential of the photosensitive drum 1 and the quantity of laser light irradiated to the photosensitive drum 1 from the exposure unit 3 (drum surface light quantity) in the post-rotation sequence shown in FIG. 4. In FIG. 5, the vertical axis indicates the surface potential of the photosensitive drum 1 (unit: V), and the horizontal axis indicates the laser light quantity irradiated to the surface of the photosensitive drum 1 (described as the light quantity on the drum surface in the Figure) (unit: μJ/cm$^2$). In the Figure, P1 through P10 indicate the laser light quantity irradiated to the photosensitive drum 1 in the post-rotation sequence in FIG. 4, and V11 through V20 indicate the surface potential of the photosensitive drum 1, −450V through 0V.

Effect of Present Embodiment

The present invention is characterized by control of the lowering of the surface potential of the photosensitive drum in the post-rotation sequence. Therefore, a comparison with comparative examples 1 and 2, in which the control in the post-rotation sequence is different, is made to explain the effect of the present embodiment.

The method of controlling the exposure control by the laser beam of the photosensitive drum 1 in the post-rotation sequence in comparative example 1 is the same as in the present embodiment, in which the surface potential of the photosensitive drum 1 is lowered by 50 V at each step, and a stepwise lowering control is performed. On the other hand, the method of controlling the exposure of the photosensitive drum 1 by the laser beam in the post-rotation sequence in the comparative example 2 is different from the present embodiment in that the lowering control is performed. The present embodiment differs in that in the post-rotation sequence in the comparative example 2, the surface potential of the photosensitive drum 1 is lowered by 300 V from −500 V to −200 V in the first exposure, and the developing voltage is lowered by 300 V from −350 V to −50 V. In addition, comparative examples 1 and 2 differ from the present embodiment in the exposure quantity, laser beam emission pattern, laser luminance, etc. in the first exposure.

Table 1 summarizes the differences in specifications between the present embodiment and comparative examples 1 and 2 in the first exposure of the post-rotation sequence. Table 1 shows the laser exposure quantity (P1), laser emission pattern (ON/OFF), laser luminance, rotation speed accuracy of the rotating polygonal mirror, and toner consumption when printing 10,000 sheets of paper P in the first exposure of the present embodiment and comparative examples 1 and 2.

TABLE 1

| | Embodiment 1 | Comparative example 1 | Comparative example 2 |
|---|---|---|---|
| Laser light quantity (P1) | 0.02 μJ/cm$^2$ | 0.02 μJ/cm$^2$ | 0.18 μJ/cm$^2$ |
| Laser emission pattern (ON/OFF) | 50%/50% | 100%/0% | 100%/0% |
| Laser luminance | 0.5 mW | 0.25 mW | 2.25 mW |
| rotation speed accuracy of the rotating polygonal mirror | −0.1% | +50% | −0.1% |
| Toner consumption/ 10,000 sheets | 100 g | 120 g | 130 g |

(Laser Light Quantity)

The laser light quantity (P1) in the first exposure is the quantity of laser light that is first irradiated from the exposure unit 3 to the photosensitive drum 1 in the post-rotation sequence, and is 0.02 μJ/cm$^2$ in both the present embodiment and comparative example 1. On the other hand, the laser exposure quantity in comparative example 2 is 0.18 μJ/cm$^2$, which is larger than in the present embodiment and comparative example 1.

(Laser Emission Pattern)

The laser emission pattern (ON/OFF) shows the ratio of the ON time that the laser light is emitted and the OFF time that the laser light is not emitted during the first exposure, when the laser light is emitted on the surface of the photosensitive drum 1. As shown in Table 1, comparative examples 1 and 2 both have 100% of the time the laser light is emitted (ON) during the first exposure. The present embodiment, on the other hand, differs from comparative examples 1 and 2 in the laser emission pattern, with the laser beam being emitted (ON) 50% of the time and the laser beam not being emitted (OFF) 50% of the time.

(Spot Diameter of Laser Light and Scanning Distance of the Laser Light)

Figure 6:
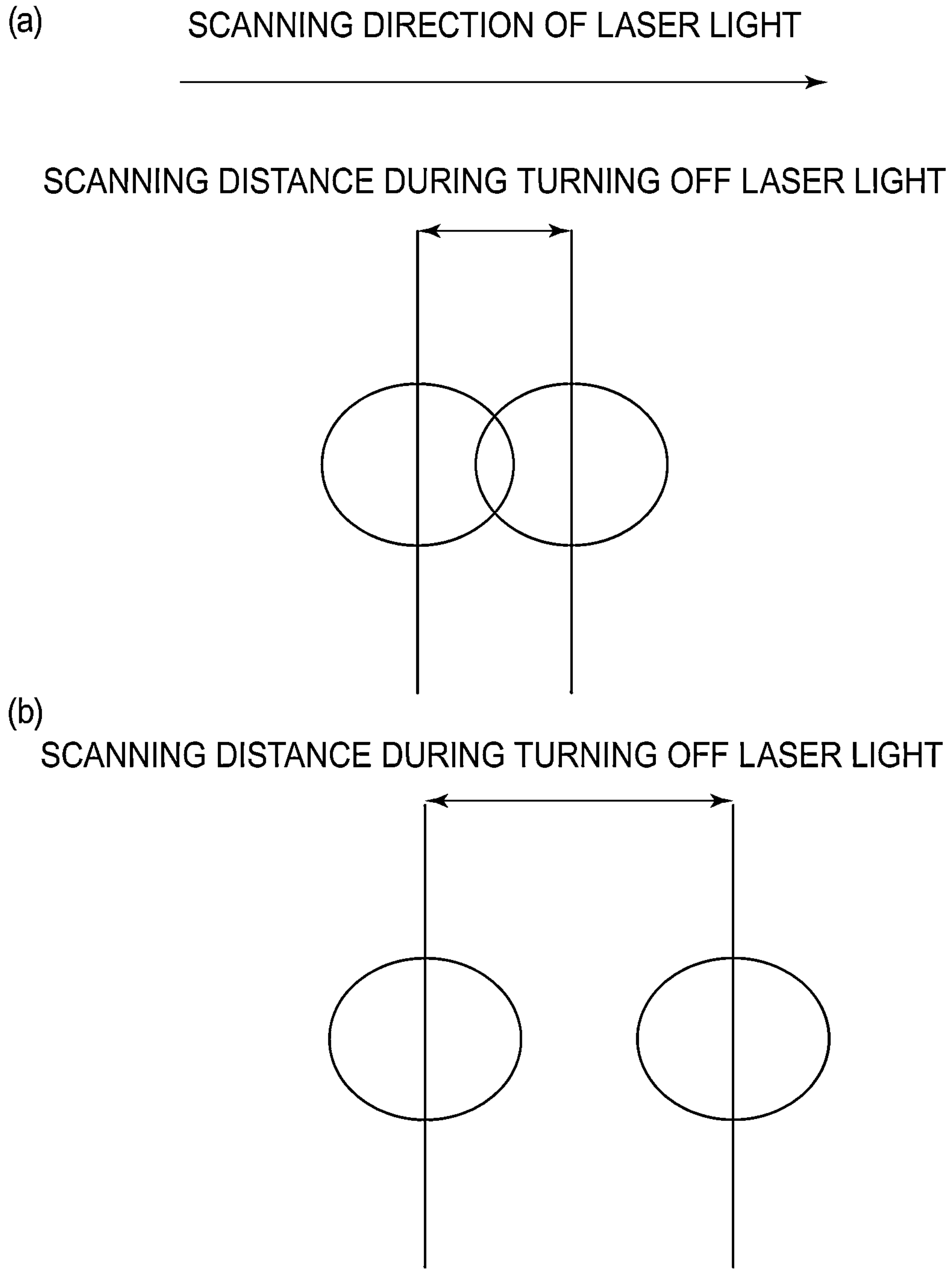
FIG. 6, part (a) and (b), is a view showing the relationship between the spot diameter of the laser beam and the scanning distance of the laser beam according to embodiment 1.

FIG. 6 illustrates the relationship between the spot diameter on the photosensitive drum 1 of the laser light emitted from the laser source 200 of the exposure unit 3 in the present embodiment and the scanning distance of the laser light. In parts (a) and (b) of FIG. 6, the vertical line indicates the timing at which the laser light is emitted from the laser source 200, and the circular circle indicates the spot diameter of the laser light emitted on the photosensitive drum 1. The laser light source 200 turns on and emits laser light at the timing indicated by the vertical line, but during the period between the vertical lines, the laser light source 200 is turned off and no laser light is emitted. The scanning of the laser light on the photosensitive drum 1 is performed from the left side to the right in the figure.

Part (a) of FIG. 6 shows a case in which the spot diameter in the scanning direction of the laser light (main scanning direction) is larger than the scanning distance when the laser light is off. In this case, since the spot diameter in the scanning direction (main scanning direction) of the laser light is larger than the scanning distance when the laser light is off, the range of the laser light when the laser light is on overlaps, and as a result, the surface of the photosensitive drum 1 is exposed evenly. On the other hand, part (b) of FIG. 6 shows a case in which the spot diameter in the scanning direction of the laser light (main scanning direction) is smaller than the scanning distance when the laser light is off. In this case, since the spot diameter in the scanning direction of the laser light (main scanning direction) is smaller than the scanning distance when the laser light is turned off, there are areas on the surface of the photosensitive drum 1 where the laser light is not emitted, and the surface of the photosensitive drum 1 is not exposed evenly. Therefore, in comparative examples 1 and 2, where the laser light is emitted (ON) 100% of the time, the surface of the photosensitive drum 1 is uniformly exposed and the surface potential is maintained at a constant level. On the other hand, in the present embodiment, the time with the laser light on (ON) and the time with the laser light off (OFF) are 50% and 50%, respectively, and the quantity of exposure received by the surface of the photosensitive drum 1 can be lowered compared to comparative examples 1 and 2. By increasing the ratio of the time the laser light is off, the quantity of exposure received by the surface of the photosensitive drum 1 can be lowered without reducing the laser luminance. In the present embodiment, the time of the lit state (ON) and the time of the off state (OFF) of the laser light during start-up and down are set to 50% and 50%, respectively, but are not limited to that. The time of the lit state in which the laser light is turned on during solid black image printing during image formation in the present embodiment is 100%, and the time of the off state in which the laser light is turned off during lowering is more effective than during solid black image printing during image formation if the ratio of the time of the off state is larger. In other words, in the present embodiment, the ratio of the laser light ON/OFF time is changed between the image forming and the stand-down times. The ratio of the OFF time of the laser light is larger when the laser light is turned off than when the image is formed. For example, the ratio of ON/OFF time may be set from 50%: 50% to 40%: 60%, and the quantity of exposure should be increased by 1.25 times (=50%/40%) so that the quantity of exposure received by the surface of the photosensitive drum 1 is the same as in the 50% case. In the present embodiment, the time for the lit state in which the laser light is turned on and the time for the unlit state in which the laser light is turned off should be 50% each.

However, as shown in part (b) of FIG. 6, if the time ratio in which the laser light is turned off is made too large, the surface potential of the photosensitive drum 1 will not be uniform when viewed microscopically. Therefore, the time interval when the laser light is turned off should be smaller than the spot diameter. In the present embodiment, the time ratio in which the laser light is emitted is 50%, so when the laser light is emitted on the surface of the photosensitive drum 1, the laser light is repeatedly turned on and off for each pixel. Therefore, the spot diameter in the main scanning direction on photosensitive drum 1 is larger than 2 pixel size in the main scanning direction (in the present embodiment, the image resolution in the main scanning direction is 600 dpi, so 2 pixel size is about 84 μm).

(Laser Luminance)

The laser luminance shown in Table 1 indicates a luminance of the laser light at the timing when the laser light enters the BD 206 during the first exposure. The laser luminance is 0.5 mW for the present embodiment, 0.25 mW for Embodiment 1, and 2.25 mW for Embodiment 2 in the comparative example. If the laser luminance is lower than the predetermined luminance (0.4 mW in the present embodiment), the BD 206 of the exposure unit 3 will not be able to detect the laser light correctly. In this embodiment, when the laser light is emitted on the surface of the photosensitive drum 1 during the first exposure, the time ratio of the laser light emitted is 50%. On the other hand, the time ratio in which the laser light is emitted is 100% when the laser light is irradiating the BD 206, which is the timing when the photosensitive drum 1 is not being scanned by the laser light.

(Accuracy of Rotational Speed of Rotating Polygonal Mirror)

The rotational speed accuracy of the rotating polygonal mirror shown in Table 1 is explained below. As described above, the engine control portion 205 controls the number of rotations of the rotating polygonal mirror 204, i.e., the number of rotations of the scanner motor (not shown) driving the rotating polygonal mirror 204, with the driving signal 220 so that the period of the BD signal 207 is the predetermined period. Here, if the laser light emitted from the laser source 200 has a laser quantity lower than the predetermined luminance (0.4 mW in the present embodiment), the BD 206 cannot detect the laser light. As a result, the BD signal 207 is not output correctly, resulting in inaccurate control of the number of rotations of the rotating polygonal mirror 204. The values shown in Table 1 indicate the maximum percentage deviation from the prescribed number of rotations of the rotating polygonal mirror 204 during the first exposure.

(Toner Consumption)

Next, "Toner consumption" in Table 1 is explained. The toner consumption shown in Table 1 indicates the amount of toner consumed when 10,000 sheets of paper P are printed at a print ratio of 2% in an environment with a temperature of 23° C. and a humidity of 50%. As shown in Table 1, the toner consumption was 100 g in the present embodiment, while it was 120 g in comparative example 1 and 130 g in comparative example 2. It was confirmed that the toner consumption in the present embodiment was less than in comparative examples 1 and 2.

Consideration of Toner Consumption in Comparative Example 1

Here, the results of toner consumption for comparative examples 1 and 2 are discussed. First, the reason why the toner consumption of comparative example 1 is higher than that of the present embodiment is discussed. As mentioned above, the rotational speed accuracy of the rotating polygonal mirror 204 is very different between comparative example 1 and the present embodiment. In comparative example 1, the rotation speed of the rotating polygonal mirror 204 is at most +50% faster during the first exposure. This is because the laser luminance in comparative example 1 is low (0.25 mW), and the detection accuracy of the laser light of the BD 206 has decreased, making it impossible to correctly control the rotation speed of the rotating polygonal mirror 204, which is performed based on the period of the BD signal 207 output by the BD 206. As a result, the first exposure amount P1 becomes 50% lower, and the surface potential V11 of the photosensitive drum 1 formed by the first exposure increases by ΔV (≈20V), as shown in FIG. 5. Furthermore, since it takes time for the number of rotations of the rotating polygonal mirror 204 to converge to the predetermined number of rotations, the target surface potential of the photosensitive drum 1 is not reached even in the second and third exposures, and the number of rotations of the rotating polygonal mirror 204 converges to the predetermined number of rotations in the fourth exposure. As a result, it is estimated that the ideal Vback value of 150 V cannot be maintained during the period from the first exposure to the third exposure, resulting in cover, and therefore, more toner consumption than in the present embodiment.

Print Sequence in Comparative Example 2

Figure 7:
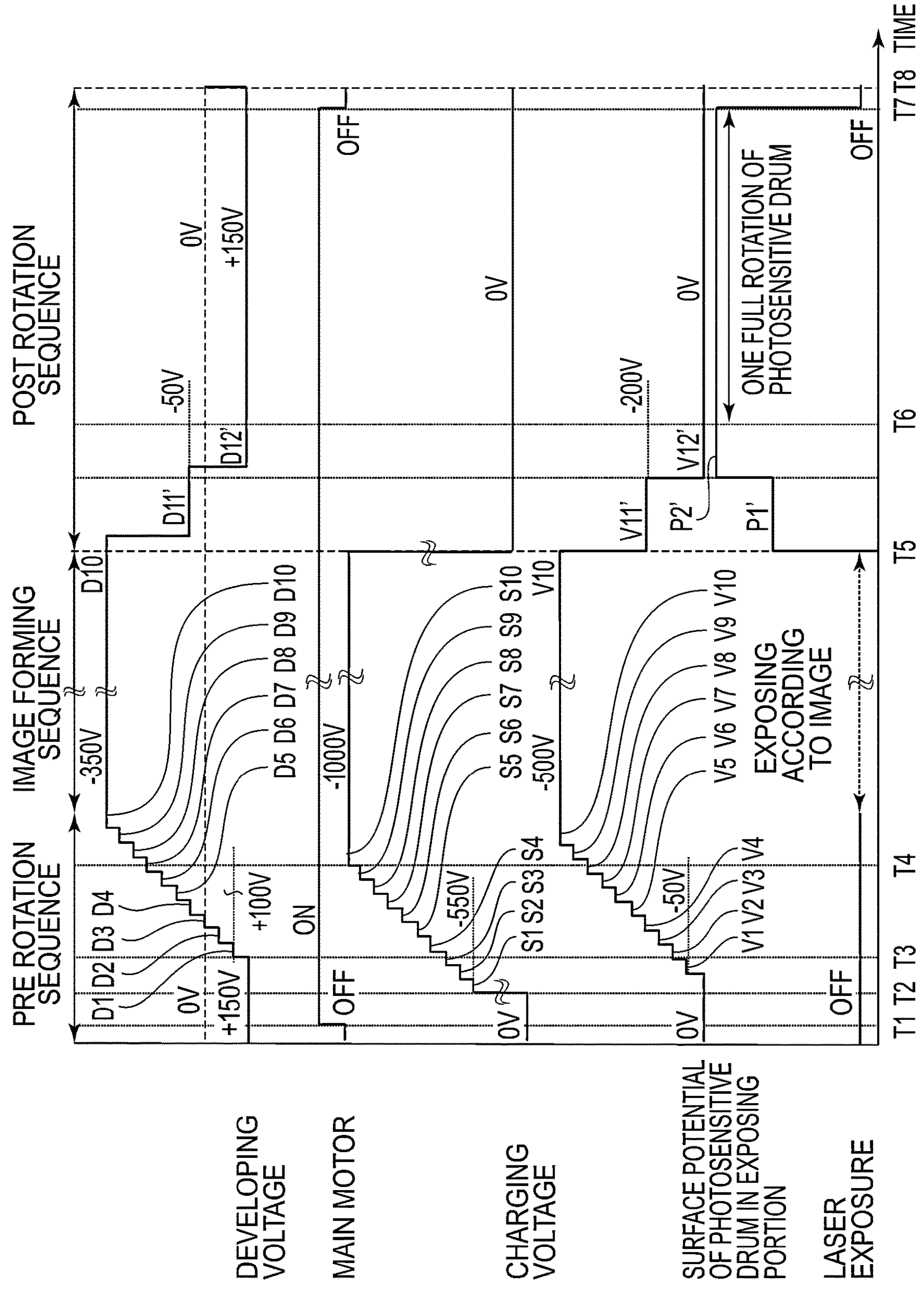
FIG. 7 is a timing chart showing the print sequence according to embodiment 1 and comparative example 2 for comparison.

Next, the reason why the toner consumption of comparative example 2 is higher than that of the present embodiment is discussed. As mentioned above, the potential difference that lowers the surface potential of the photosensitive drum 1 in the first exposure differs between the present embodiment and comparative example 2. FIG. 7 is a timing chart explaining the print sequence of comparative example 2. In FIG. 7, the control in the pre-rotation sequence and the image forming control is the same as that in the present embodiment shown in FIG. 4 above, and the explanation is omitted. As shown in FIG. 7, the post-rotation sequence starts at timing T5 after image formation on paper P in the image forming sequence is completed. At timing T5, the charging voltage power source 52 stops applying the tenth charging voltage S10 (−1,000 V) to the charging roller 2. Then, the laser control portion 201 of the exposure unit 3 controls the laser light source 200 to start emitting a laser light and performs a first exposure to expose the surface of the photosensitive drum 1 with the first exposure quantity P1' (0.18 μJ/cm$^2$). By performing the first exposure, the surface potential of the photosensitive drum 1 is lowered from V10 (−500 V) to V11' (−200 V), a 300 V drop.

After the first exposure is completed, a second exposure is performed to expose the surface of the photosensitive drum 1 with the second exposure quantity P2'. As a result, the surface potential of the photosensitive drum 1 is lowered by 200 V from V11' (−200 V) to V12' (0 V). The second exposure is performed for the time equivalent to one cycle of the photosensitive drum from timing T6 to timing T7 so that the surface potential of the photosensitive drum 1 is V12' (0V) for the entire cycle. On the other hand, as in the pre-rotation sequence, the developing voltage is controlled to be lowered so that Vback, which is the potential difference between the surface potential of the photosensitive drum 1 and the developing voltage, is maintained at 150 V at the position of the developing nip portion where the photosensitive drum 1 opposes the developing roller 42. In other words, in the control for lowering the developing voltage, the developing voltage D11' (−50V) is applied to the developing roller 42 and the potential difference is lowered by 300V, and then the developing voltage D12' (+150V) is applied to the developing roller 42 according to the second exposure.

Consideration of Toner Consumption in Comparative Example 2

Figure 8:
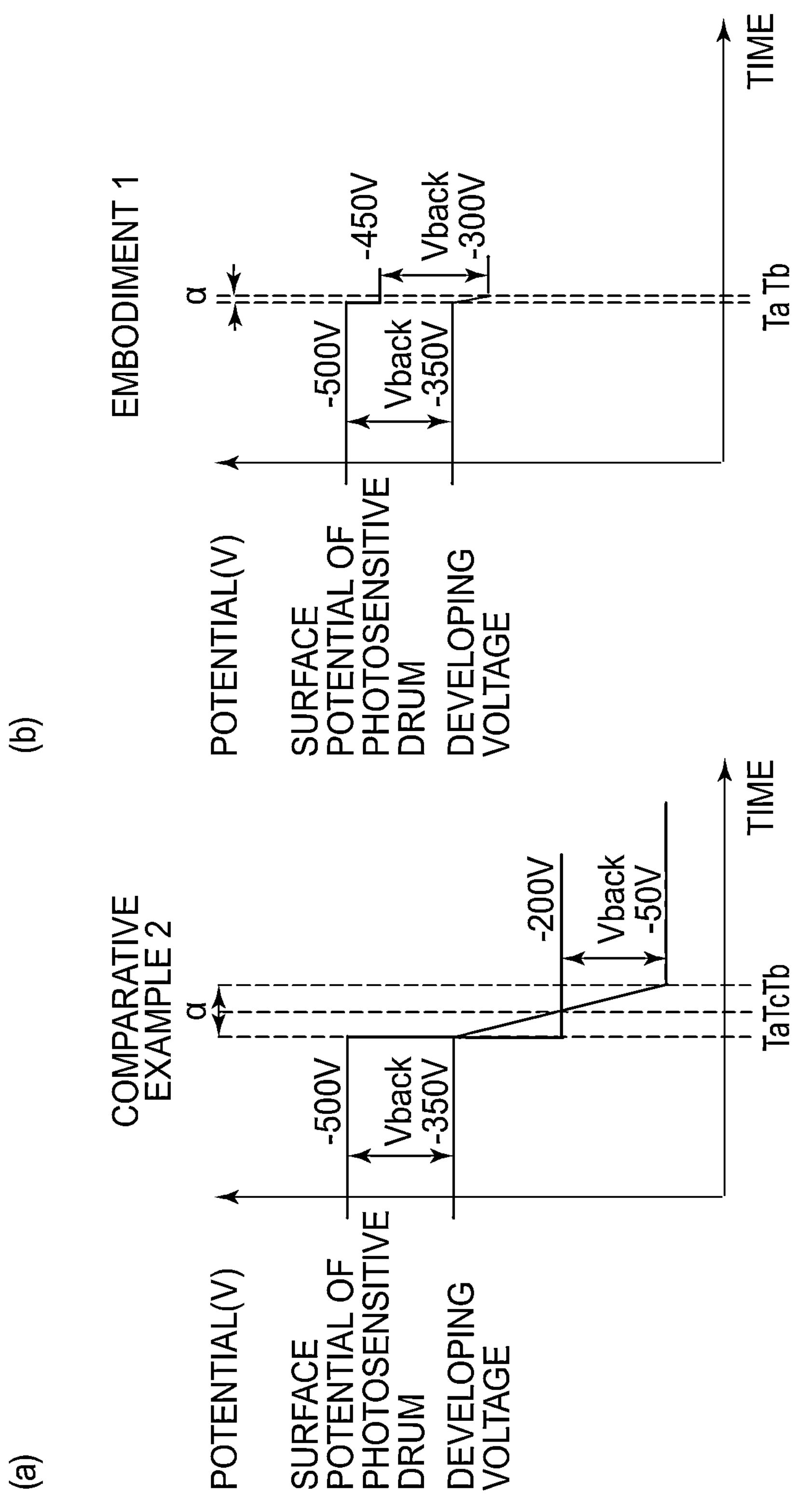
FIG. 8, part (a) and (b), is a view showing the relationship between the surface potential of the photosensitive drum 1 and the developing voltage in embodiment 1 and comparative example 2.

FIG. 8 explains the relationship between the surface potential of the photosensitive drum 1 and the developing voltage in comparative example 2 and in the present embodiment. Part (a) of FIG. 8 shows the relationship between the surface potential of the photosensitive drum 1 and the developing voltage in the developing nip portion where the photosensitive drum 1 and the developing roller 42 contact portion in comparative example 2. The vertical axis of part (a) of FIG. 8 shows the potential (unit: V) and the horizontal axis shows time. Ta, Tb, and Tc indicate timing (time). Until timing Ta, when the post-rotation sequence starts, the surface potential of the photosensitive drum 1 and the developing voltage are −500 V and −350 V, respectively, and Vback is maintained at 150 V. At timing Ta, when the first exposure is made to expose the surface of the photosensitive drum 1 with the first exposure dose P1' (0.18 μJ/cm$^2$), the surface potential of the photosensitive drum 1 instantly drops from −500V to −200V, a 300V (0.18 μJ/cm$^2$) drop.

On the other hand, the developing voltage power source 50 controls the developing voltage applied to the developing roller 42 to fall by 300 V from −350 V to −50 V. As mentioned above, the developing voltage power source 50 requires time for the output voltage to fall to the target voltage. In comparative example 2, it takes a period of time a (300 ms) from timing Ta to timing Tb, when the developing voltage lowering is started, for the developing voltage to fall from −350 V to −50 V. Therefore, the drop in the surface potential of the photosensitive drum 1 is faster than the drop in the developing voltage, and as a result, Vback becomes smaller than the target of 150V during the period a. In other words, in the period from timing Ta to timing Tc, when the developing voltage starts to fall, the developing voltage is higher than the surface potential of the photosensitive drum 1, resulting in blurring where toner on the developing roller 42 is transferred to the photosensitive drum 1.

On the other hand, part (b) of FIG. 8 shows the relationship between the surface potential of the photosensitive drum 1 and the developing voltage in the developing nip portion where the photosensitive drum 1 and the developing roller 42 contact portion in the present embodiment. The vertical axis of part (b) of FIG. 8 shows the potential (unit: V), and the horizontal axis shows time. Ta and Tb also indicate timing (time). Until timing Ta, when the post-rotation sequence starts, the surface potential of the photosensitive drum 1 and the developing voltage are −500 V and −350 V, respectively, and Vback is maintained at 150 V. At timing Ta, when the first exposure is made to expose the surface of the photosensitive drum 1 with the first exposure quantity P1 (0.02 $\mu J/cm^2$), the surface potential of the photosensitive drum 1 instantly drops from −500V to −450V, or 50V. On the other hand, the developing voltage is lowered by 50 V from −350 V to −300 V, which is a smaller potential difference than the 300 V in comparative example 2. As a result, the required period a from timing Ta to timing Tb for a 50 V standstill of the developing voltage is 20 ms in the present embodiment, which is a shorter time than the 300 ms in comparative example 2.

In addition, although Vback in the section a from the timing Ta where the drop in developing voltage starts to the timing Tb where the drop in developing voltage is completed becomes slightly smaller than the ideal value of 150V, the potential difference can be suppressed to a level where almost no blurring occurs. Thus, it is estimated that in comparative example 2, the toner consumption is higher than in the present embodiment because Vback is smaller.

In the present embodiment, the developing roller 42 is in constant contact with the photosensitive drum 1. In the post-rotation sequence, Vback can be maintained constant and the surface potential of the photosensitive drum can be controlled to drop stably without compromising the detection accuracy of the laser light by the BD 206.

As explained above, the present embodiment can suppress the generation of blurring during non-image formation when no toner image is formed on the photosensitive drum.

Embodiment 1 describes an example in which the ratio of the on (on) and off (off) times of the laser light sources emitting the laser light is 50% each when scanning the surface of the photosensitive drum with the laser light during the first exposure, and the on and off times of the laser light sources are repeated for each pixel. Embodiment 2 describes the control of the post-rotation sequence when there are two laser light sources emitting laser light.

[Laser Light Source]

The laser light source 200 in the present embodiment differs from the configuration of Embodiment 1 in that it has two light sources, whereas Embodiment 1 had one light source. Therefore, in the present embodiment, when scanning the surface of the photosensitive drum 1 with laser light by rotating polygonal mirror 204, two pixels in the sub-scanning direction (feeding direction of paper P), or two lines in one scan, can be exposed simultaneously. Other configurations of the exposure unit 3, image forming apparatus, and developing unit are the same as in embodiment 1, and the same symbols are used for the same devices and components as in embodiment 1, thus omitting the explanation here.

[Post-Rotation Sequence]

In embodiment 1, in the first exposure, when scanning the surface of the photosensitive drum 1 with the laser light in the post-rotation sequence, the laser light source 200 was controlled to expose the surface of the photosensitive drum 1 by repeatedly turning the laser light on and off for each pixel (pixel). In the present embodiment, on the other hand, the first exposure method is different. That is, in embodiment 1, in the post-rotation sequence, one of the two laser light sources is turned on (on) and the other laser light source is turned off (off) to expose the surface of the photosensitive drum 1 in the post-rotation sequence. This allows the quantity of laser light irradiated on the surface of the photosensitive drum 1 to be reduced to 50% of that when the two laser light sources are turned on (on), without reducing the laser quantity of the laser light used at the timing when the BD 206 detects the laser light.

[Spot Diameter and Scanning Distance of Laser Light]

Figure 9:
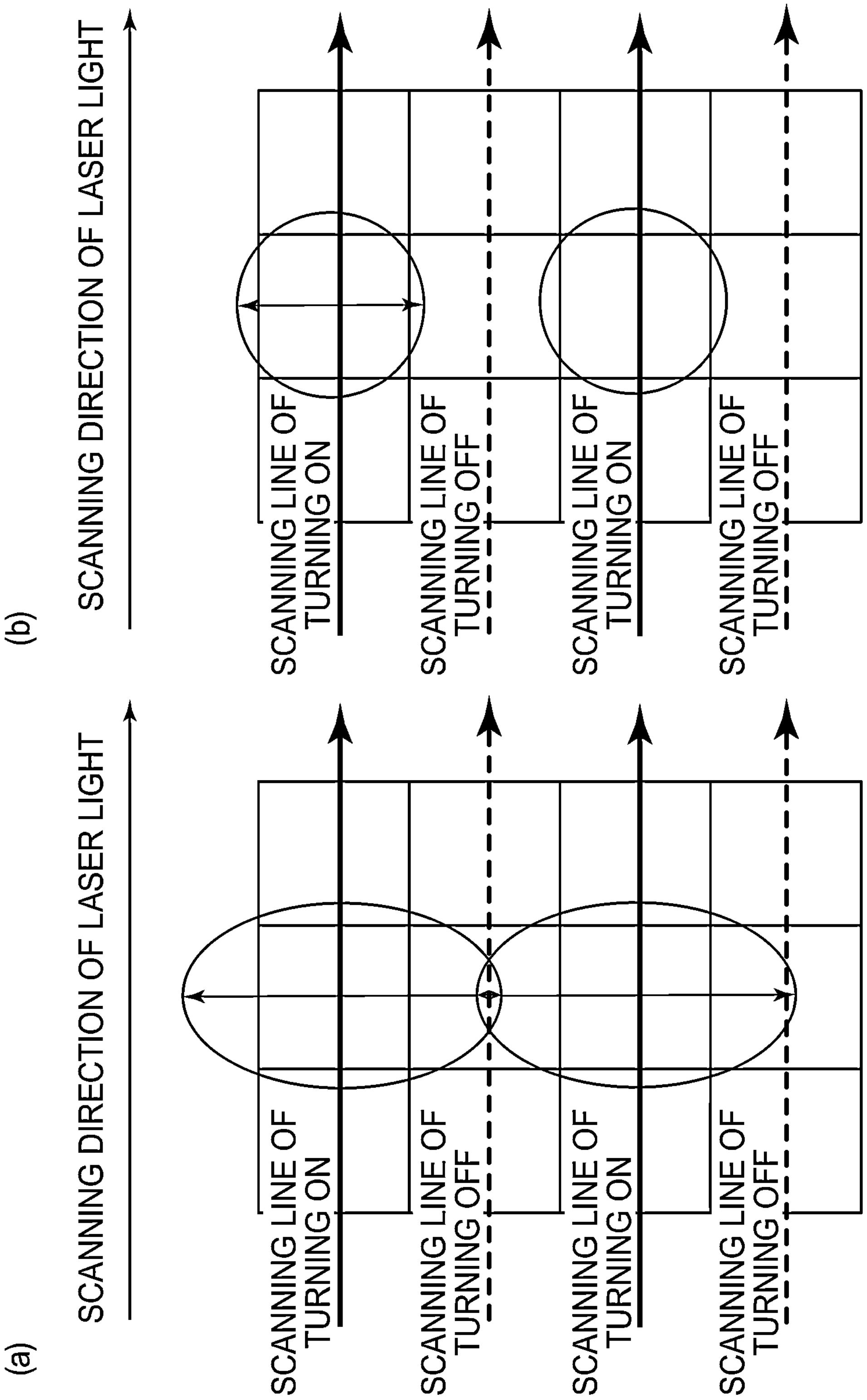
FIG. 9, part (a) and (b), is a view showing the relationship between the spot diameter of the laser beam and the distance of the laser beam in the sub-scanning direction according to embodiments 2 and 3.

FIG. 9 shows the relationship between the spot diameter of the laser light emitted from the laser source 200 of the exposure unit 3 in the present embodiment on the photosensitive drum 1 and the distance of the laser light in the sub-scanning direction.

In parts (a) and (b) of FIG. 9, the frame surrounded by vertical and horizontal lines indicates the size of one pixel (pixel), and the circle or oval shape indicates the spot diameter of the laser light emitted on the photosensitive drum 1. The thick solid line indicates the scanning line in the main scanning direction scanned by the laser light from the laser light source that is turned on among the two laser light sources, and the dashed line indicates the scanning line in the main scanning direction scanned by the laser light from the laser light source that is turned off. The scanning of the laser light on the photosensitive drum 1 in the figure is performed from the left side to the right.

Part (a) of FIG. 9 shows a case in which the spot diameter of the laser light in the sub-scanning direction is larger than two pixel size in the sub-scanning direction (in the present embodiment, the image resolution of the sub-scanning method is 600 dpi, so two pixel size is about 84 μm). In this case, since the spot diameter of the laser light in the sub-scanning direction is larger than two pixel size, the area where the laser light is irradiated every other line overlaps, blurring the scanning lines where the laser light is not irradiated. As a result, the surface of the photosensitive drum 1 is uniformly exposed. On the other hand, part (b) of FIG. 9 shows a case in which the spot diameter of the laser light in the sub-scanning direction is smaller than the two-pixel size in the sub-scanning direction. In this case, the surface of the photosensitive drum 1 is not uniformly exposed because there are areas where the laser light is not irradiated in the area of pixels included in the scanning lines where the laser light is not irradiated. Therefore, in the present embodiment, the spot diameter in the sub-scanning direction on the photosensitive drum 1 is larger than the two pixel size in the sub-scanning direction (in the present embodiment, the image resolution of the main scanning method is 600 dpi, so the two pixel size is about 84 μm).

In the present embodiment, one laser light source is turned on (ON) and the other laser light source is turned off (OFF) to expose the surface of the photosensitive drum 1. As a result, the time of the lit state (ON) and the time of the unlit state (OFF), where the laser light is turned on and off, respectively, at standstill is 50%, but is not limited to that. For example, instead of 100% of the time for one laser light source to be in the lit state (ON), it may be set so that the ratio of the time the laser light is lit is further reduced from 50% by switching it to the lit state (ON) and the unlit state (OFF) for each pixel. In this case, the quantity of exposure irradiated on the photosensitive drum 1 should be increased according to the reduced time ratio. In addition, the spot diameter in the main scanning direction where the laser light is irradiated needs to be larger than 2 pixels so that the laser light is also irradiated to the pixel positions corresponding to the off state where no laser light is irradiated. In the present embodiment, the time for the lit state in which the laser light is turned on and the time for the off state in which the laser light is turned off should be 50% and 50%, respectively.

In the present embodiment, the developing roller 42 is in constant contact with the photosensitive drum 1. In the post-rotation sequence, Vback can be maintained constant and the surface potential of the photosensitive drum can be controlled to stand down stably without compromising the detection accuracy of the laser light by the BD 206.

As explained above, the present embodiment can suppress the generation of blurring during non-image formation when no toner image is formed on the photosensitive drum.

In the present embodiment, the method of exposing the photosensitive drum in the post-rotation sequence is different from that in embodiment 1. The configuration of the image forming apparatus, exposure unit, and developing unit is the same as in embodiment 1, and the same symbols are used for the same devices and components as in embodiment 1, so the explanation is omitted here.

[Post-Rotation Sequence]

In embodiment 1, when scanning the surface of the photosensitive drum 1 with a laser light during the first exposure of the post-rotation sequence, the laser light source 200 was controlled to be turned on and off repeatedly for each pixel (pixel) to expose the surface of the photosensitive drum 1. In the present embodiment, on the other hand, when the laser light is emitted to the rotating polygonal mirror 204 having four reflective surfaces during the first exposure in the post-rotation sequence, the exposure control is performed by emitting the laser light to two reflective surfaces and not emitting the laser light to the remaining two reflective surfaces. Specifically, when a laser light is emitted on the first surface of the rotating polygonal mirror 204, exposure control is performed where the laser light is not emitted on the second surface, the laser light is emitted on the third surface, and the laser light is not emitted on the fourth surface. This reduces the quantity of laser light emitted on the surface of the photosensitive drum 1 to 50% of that emitted when the laser light is emitted on the four reflective surfaces, without reducing the laser quantity of the laser light used when the BD 206 detects the laser light.

When the laser light is emitted every other surface for the four reflecting surfaces of the rotating polygonal mirror 204 described above, if the spot diameter in the sub-scanning direction is small, as shown in part (b) of FIG. 9, the surface potential of the photosensitive drum 1 will be non-uniform when viewed microscopically. Therefore, in Embodiment 1, the spot diameter in the sub-scanning direction is larger than 2 pixel size in the sub-scanning direction (in the present embodiment, 2 pixel size is about 84 μm), as shown in part (a) of FIG. 9, in order to maintain a uniform surface potential of the photosensitive drum 1.

In the present embodiment, the state of the laser light source is switched between the lit state (ON) and the unlit state (OFF) state every other surface of the reflecting surface of the rotating polygonal mirror 204. As a result, the time of the lit state (ON) and the time of the unlit state (OFF) of the laser light at the start-up and the time of the unlit state (OFF) is 50% respectively, but is not limited to that. For example, instead of 100% of the time the laser light is on (ON), it may be set so that the ratio of time the laser light is on is further reduced from 50% by switching the laser light to the on state (ON) and off state (OFF) for each pixel. In this case, the quantity of exposure irradiated on the photosensitive drum 1 should be increased according to the reduced time ratio. In addition, the spot diameter in the main scanning direction where the laser light is irradiated needs to be larger than 2 pixels so that the laser light is also irradiated to the pixel positions corresponding to the off state where no laser light is irradiated. In the present embodiment, the time for the lit state in which the laser light is turned on and the time for the off state in which the laser light is turned off should be 50% and 50%, respectively.

In the present embodiment, the developing roller 42 is in constant contact with the photosensitive drum 1. In the post-rotation sequence, Vback can be maintained constant and the surface potential of the photosensitive drum can be controlled to stand down stably without compromising the detection accuracy of the laser light by the BD 206.

As explained above, the present embodiment can suppress the generation of blurring during non-image formation when no toner image is formed on the photosensitive drum.

In embodiment 1, a laser light quantity (0.04 μJ/cm$^2$) with a laser luminance of 0.5 mW was emitted from the laser light source in order to enable the BD to detect the laser light. However, since the laser light quantity of the laser light irradiating the surface of the photosensitive drum during the first exposure was 0.02 ρJ/cm$^2$, the laser light quantity was controlled to be set to one-half by setting the lighting time ratio of the laser light source emitting the laser light to 50%. In embodiment 4, unlike embodiment 1, the lighting (on) time ratio of the laser light source emitting the laser light during the first exposure is set to 100%, and an embodiment in which the surface potential of the photosensitive drum can be set to the desired potential of the photosensitive drum in embodiment 1 even using a laser light quantity that can be detected by BD is described. The configuration example of the image forming apparatus, exposure unit, and developing unit is the same as in embodiment 1, and the explanation here is omitted by using the same symbols for the same devices and components as in embodiment 1.

[Print Sequence]

Figure 10:
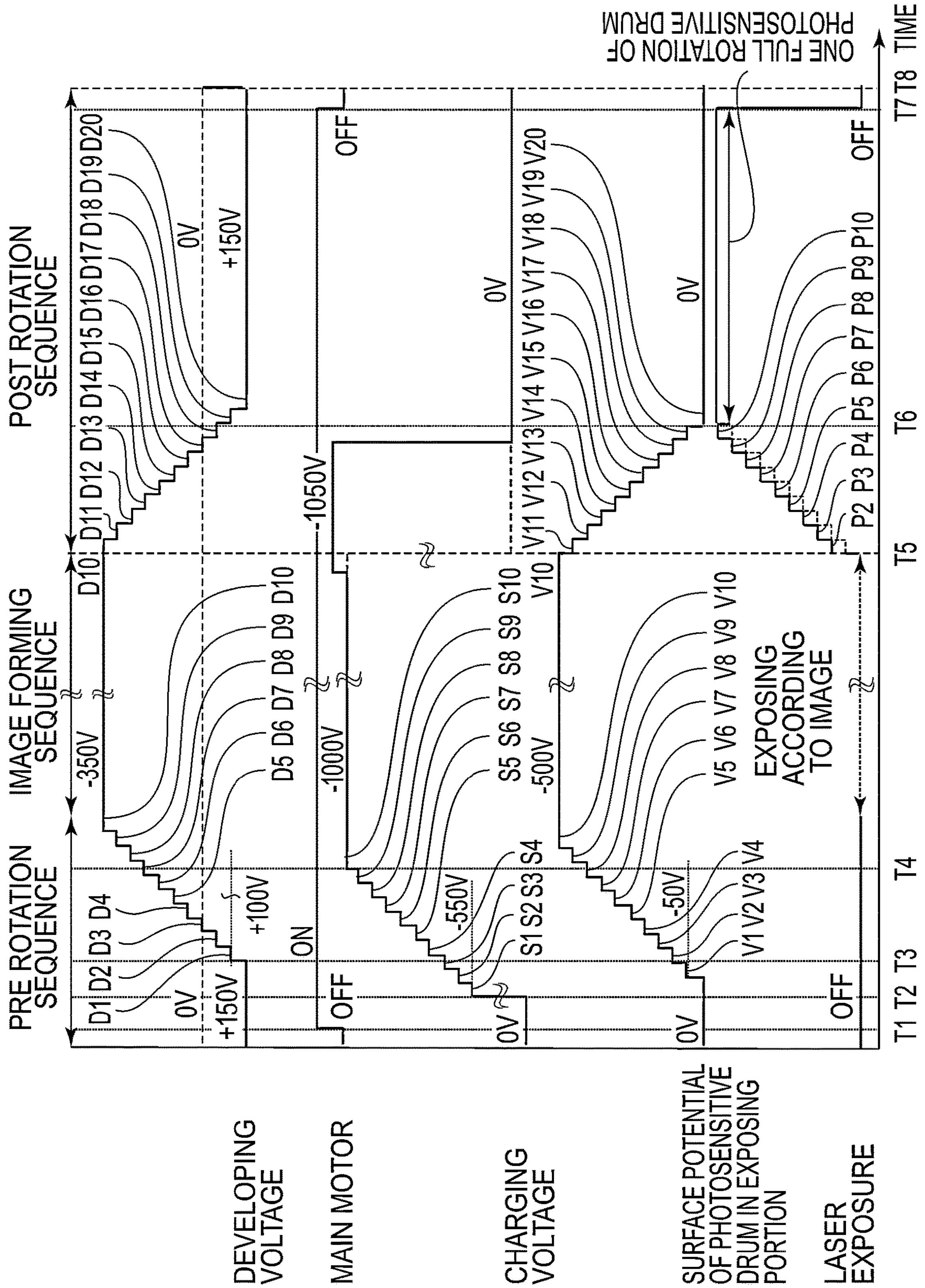
FIG. 10 is a timing chart showing the print sequence of embodiment 4.

FIG. 10 is a timing chart showing the relationship between the developing voltage, charging voltage, main motor driving each roller, surface potential of the photosensitive drum 1, and the quantity of laser light irradiated to the photosensitive drum 1 in the print sequence of the present embodiment. In FIG. 10, the horizontal axis indicates time, and T1 to T8 indicate timing (time). In FIG. 10, the control in the pre-rotation sequence and the image forming control is the same as the control shown in FIG. 4 of embodiment 1 above, and the explanation here is omitted.

In the laser light quantity in the post-rotation sequence in FIG. 10, the solid line shows the control in the present embodiment, and the dotted line shows the control in embodiment 1 described above. The exposure method during the first exposure in the above mentioned embodiments 1 to 3 was an exposure method in which the time ratio of the time the laser light is emitted (on) and the time it is not emitted (off) from the laser light source 200 is 50%, respectively. On the other hand, the exposure method during the first exposure in the present embodiment differs from embodiments 1 to 3 in that the exposure is performed so that the time when the laser light is emitted (on) from the laser light source 200 is 100%.

As shown in FIG. 10, at timing T5, the process switches from the image forming sequence to the post-rotation sequence. At timing T5, the surface potential of the photosensitive drum 1 is controlled to fall to V11 (−450V) by irradiating the laser light from the exposure unit 3. In the present embodiment, prior to timing T5, the charging voltage applied to the charging roller 2 by the charging voltage power source 52 is increased in advance from −1,000 V to −1050 V, and the surface potential of the photosensitive drum 1 is set to −550 V. In the present embodiment, the first exposure of the photosensitive drum 1 is performed at a laser luminance of 0.50 mW, which is the laser quantity at which the detection accuracy of the laser light by the BD 206 does not decrease. The laser quantity when the laser luminance is 0.50 mW is the second exposure quantity P2 (0.04 μJ/cm$^2$) in embodiment 1, which is twice the first exposure quantity P1 (0.02 μJ/cm$^2$) in embodiment 1.

As explained in embodiment 1, when the surface of the photosensitive drum 1 is exposed at the first exposure quantity P1 (0.02 μJ/cm$^2$), the surface potential of the photosensitive drum 1 is lowered by 50 V. Similarly, when the surface of the photosensitive drum 1 is exposed at the second exposure quantity P2 (0.04 μJ/cm$^2$), the surface potential of the photosensitive drum 1 is lowered by 100 V. Therefore, in order to make the surface potential of the photosensitive drum 1 after exposure similar to that of embodiment 1, in the present embodiment, the charging potential of the photosensitive drum 1 is set to −1050V, which is 50V greater on the negative side than in embodiment 1, in accordance with the timing of exposure.

Then, as shown in FIG. 10, the second exposure is performed with the third exposure quantity P3 of embodiment 1, while the charging voltage is increased to −1050V. By increasing the charging potential of the photosensitive drum 1 by 50V, more on the negative side than in embodiment 1, in accordance with the timing of the exposure, the surface potential of the photosensitive drum 1 is increased by 50V, more on the negative side, and the laser light quantity is set to be 50V more on the positive side than the light quantity of embodiment 1. As a result, the surface potential of the photosensitive drum 1 after the second exposure is −400 V, which is the same surface potential as in embodiment 1.

Then, at timing T6 in FIG. 10, specifically, in embodiment 1, the charging voltage is set to 0 V in advance to coincide with the timing when the surface potential of the charging portion of the photosensitive drum 1 surface to which the laser light is irradiated is dropped by 50 V from −50 V (V19) to 0 V (V20). This makes the surface potential of the photosensitive drum 1 −500V and further drops the surface potential of the photosensitive drum 1 to 0V (V20) by performing the 10th exposure by the 10th exposure quantity P10.

[Relationship Between the Surface Potential of the Photosensitive Drum and the Laser Exposure Quantity]

Figure 11:
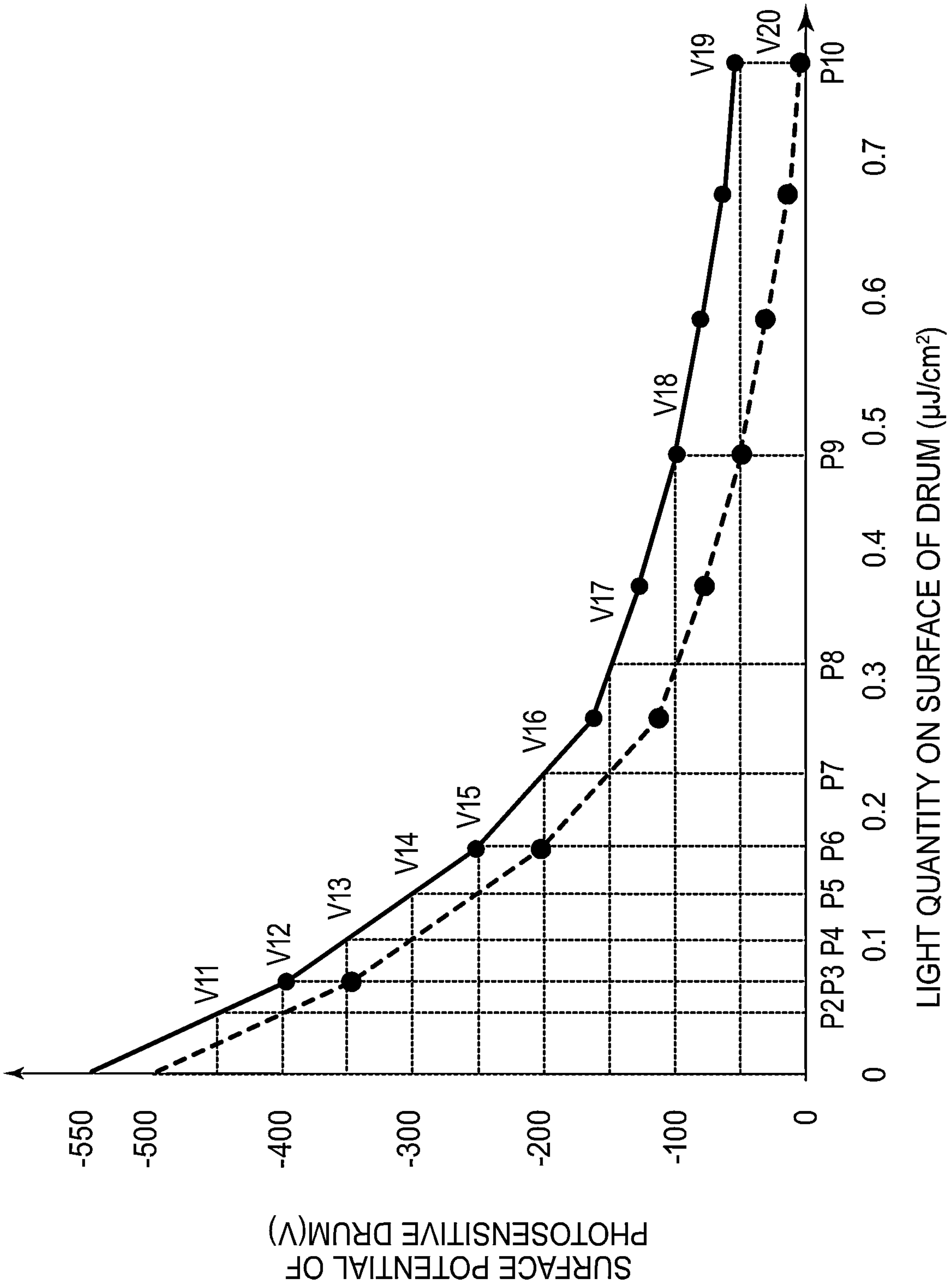
FIG. 11 is a graph showing the relationship between the laser exposure quantity and the surface potential of the photosensitive drum according to embodiment 4.

FIG. 11 is a graph showing the relationship between the surface potential of the photosensitive drum 1 and the quantity of laser light irradiated from the exposure unit 3 in the post-rotation sequence shown in FIG. 10. In FIG. 11, the vertical axis indicates the surface potential of the photosensitive drum 1 (unit: V), and the horizontal axis indicates the laser light quantity irradiated to the surface of the photosensitive drum 1 (described as the drum surface light quantity in the Figure) (unit: μJ/cm$^2$). In the Figure, P2 to P10 indicate the laser light quantity irradiated to the photosensitive drum 1 in the post-rotation sequence shown in FIG. 10, and V11 to V20 indicate the surface potential of the photosensitive drum 1, −450V to 0V. In FIG. 11, the solid line shows the E-V curve when the charging voltage is −1050V in embodiment 4, and the dotted line shows the E-V curve when the charging voltage is −1,000V in embodiment 1.

As described above, even in a configuration where the developing roller 42 is in constant contact with the photosensitive drum 1, the post-rotation sequence can control the dropping of the surface potential of the photosensitive drum 1 with an increased charging voltage without reducing the detection accuracy of the laser light by the BD 206. As a result, the post-rotation sequence can be controlled to suppress the generation of blurring.

As explained above, the present embodiment can suppress the generation of coverings during non-image formation when no toner image is formed on the photosensitive drum.

Figure 12:
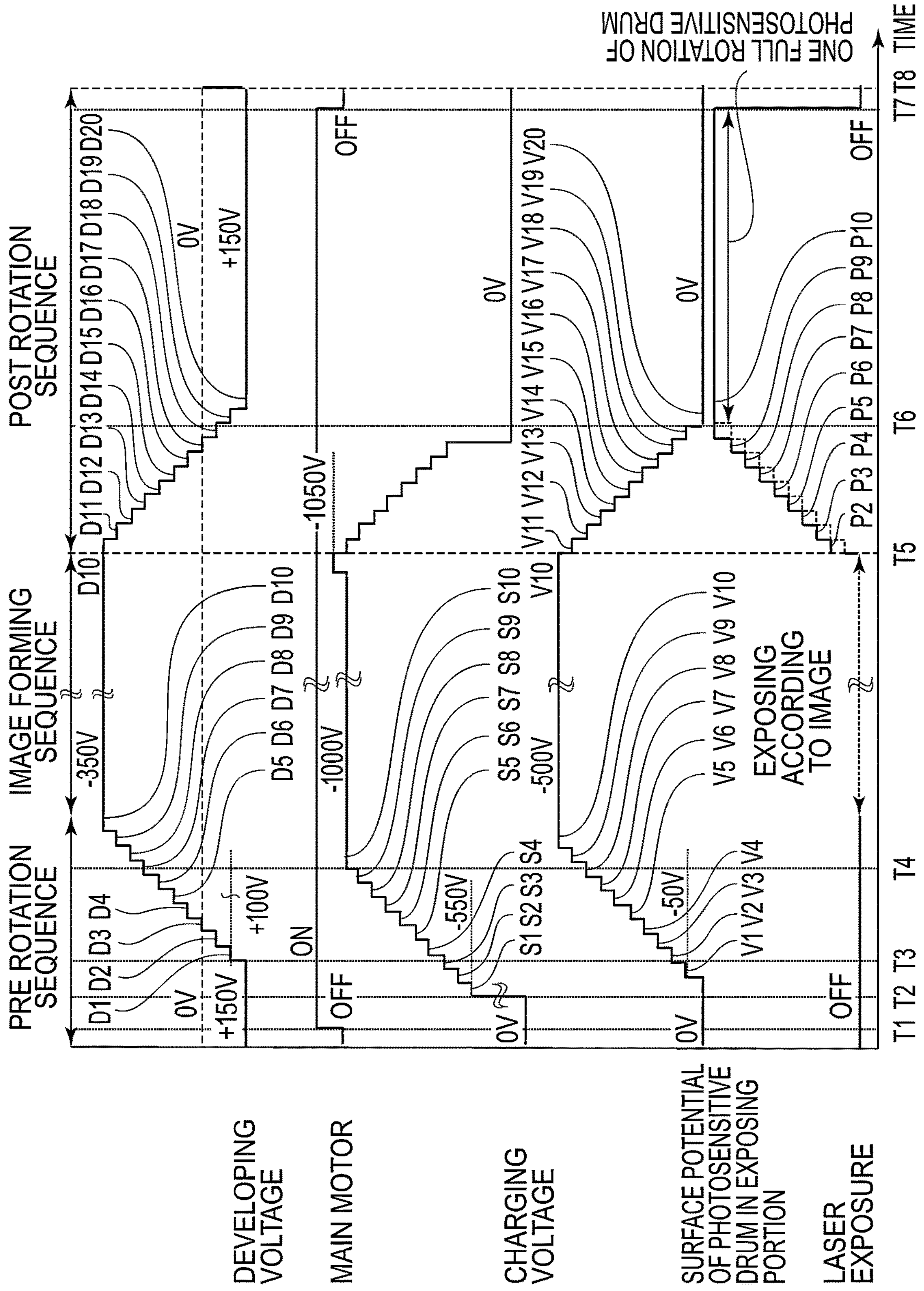
FIG. 12 is a timing chart illustrating other print sequences in embodiment 4.

In Embodiment 4, the charging voltage was kept constant at −1050 V to increase the exposure quantity, but since it is sufficient to increase the exposure quantity of P2 to be exposed in the first exposure, the charging voltage after P2 may be decreased according to the exposure quantity. In FIG. 10, since the surface potential of the photosensitive drum 1 decreases by 50 V, the charging voltage may be decreased by 50 V as described in FIG. 12. The control of FIG. 12 is effective because it can suppress the discharge in the charging portion and also suppress the deterioration of the photosensitive drum 1.

The present embodiment explains how the first exposure of embodiment 1 described above is applied not only to the post-rotation sequence, but also to the period between the start-up of the charging voltage in the pre-rotation sequence and the start of the lowering of the charging voltage in the post-rotation sequence, when no image formation is being performed. The configuration of the image forming apparatus, exposure unit, and developing unit is the same as in embodiment 1, and the same symbols are used for the same devices and components as in embodiment 1, so the explanation is omitted here.

[Print Sequence]

Figure 13:
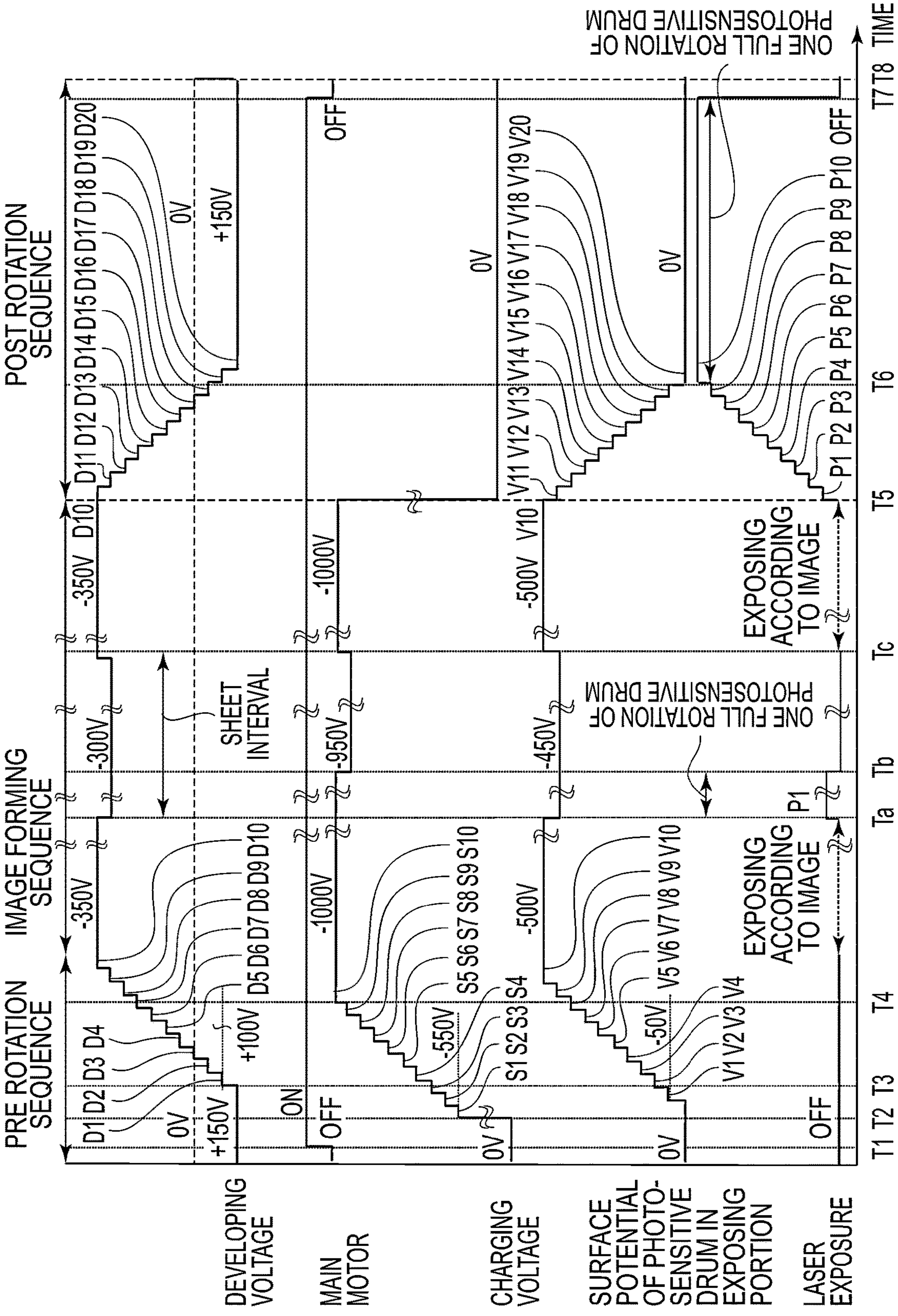
FIG. 13 is a timing chart showing the print sequence according to embodiment 5.

First, the control of the present embodiment is explained. FIG. 13 is a timing chart explaining the relationship between the developing voltage, charging voltage, main motor driving each roller, surface potential of the photosensitive drum 1, and the quantity of laser light irradiated to the photosensitive drum 1 in the print sequence of the present embodiment. In FIG. 13, the horizontal axis indicates time, and T1 to T8, Ta, Tb, and Tc indicate timing (time). In FIG. 13, the control in the pre-rotation sequence and post-rotation sequence is the same as the control shown in FIG. 4 of embodiment 1 above, and the explanation is omitted here.

In the present embodiment, the same exposure control as the first exposure in embodiment 1 is performed during the period in the image forming sequence when image forming is not taking place between the trailing end of the preceding paper in the feeding direction and the leading end of the subsequent paper in the feeding direction (hereinafter referred to as "paper interval"). In FIG. 13, the period from timing Ta to timing Tc is the paper interval. Here, the present embodiment control of exposure in the paper interval when the paper interval is longer than the time required for the photosensitive drum 1 to make one revolution is explained. As shown in FIG. 13, the surface potential of the photosensitive drum 1 during image formation is −500 V, as in embodiment 1. Then, at timing Ta, the surface of the photosensitive drum 1 is exposed with the first exposure quantity P1, similar to the first exposure in embodiment 1, while the charging voltage is kept at −1,000 V in order to lower the surface potential of the photosensitive drum 1 during the subsequent paper interval. As a result, the surface potential of the photosensitive drum 1 is lowered from −500V to −450V. At this time, it is more suitable to set the developing voltage from −350V to −300V along with the lowering of the surface potential of the photosensitive drum 1, because the Vback can be the same as during image formation.

Furthermore, during the period from timing Tb to timing Tc, which exceeds the time for the photosensitive drum 1 to complete one revolution, the charging voltage supplied from the charging voltage power source 52 is switched from −1,000 V to −950 V without any exposure by laser light. This allows the surface potential of the photosensitive drum 1 to be maintained at −450V. After timing Tc, the charging voltage supplied from the charging voltage power source 52 is switched from −950V to −1,000V in accordance with the timing of image formation, so that the surface potential of the photosensitive drum 1 during image formation can be restored from −450V to −500V. Furthermore, the developing voltage is also restored from −300V to −350V at timing Tc, if it was set at −300V during paper interval.

In the image forming sequence, during the period when images are not being formed, it is often not necessary to apply a charging voltage that becomes the surface potential of the photosensitive drum 1 during image forming. For example, during the period when images are not being formed, the surface potential of the photosensitive drum 1 does not have to be the surface potential to obtain the required image quality, such as image density and line thickness. Therefore, in such cases, lowering the surface potential of the photosensitive drum 1 to a standing potential lower than the surface potential during image formation is effective in suppressing the phenomenon of the photosensitive drum 1 being scraped with use and the image defects associated with the accumulation of discharge products called drum flow.

In the present embodiment, the first exposure by the laser light source 200 of embodiment 1, which has one light source, was used for the explanation. For example, the present embodiment can be applied to a laser light source 200 with two light sources, as in embodiment 2, or to a configuration in which the output of the laser light from the laser light source 200 is switched for each reflective surface of the rotating polygonal mirror 204, as in embodiment 3.

As explained above, the present embodiment can suppress the generation of blurring during non-image formation when no toner image is formed on the photosensitive drum.

The present embodiment explains how the first exposure of embodiment 4 described above is applied not only to the post-rotation sequence, but also to the period between the start-up of the charging voltage in the pre-rotation sequence and the start of the lowering of the charging voltage in the post-rotation sequence, when no image formation is being performed. The configuration of the image forming apparatus, exposure unit, and developing unit is the same as in embodiment 4, and the same symbols are used for the same devices and components as in embodiment 4, so the explanation is omitted here.

[Print Sequence]

Figure 14:
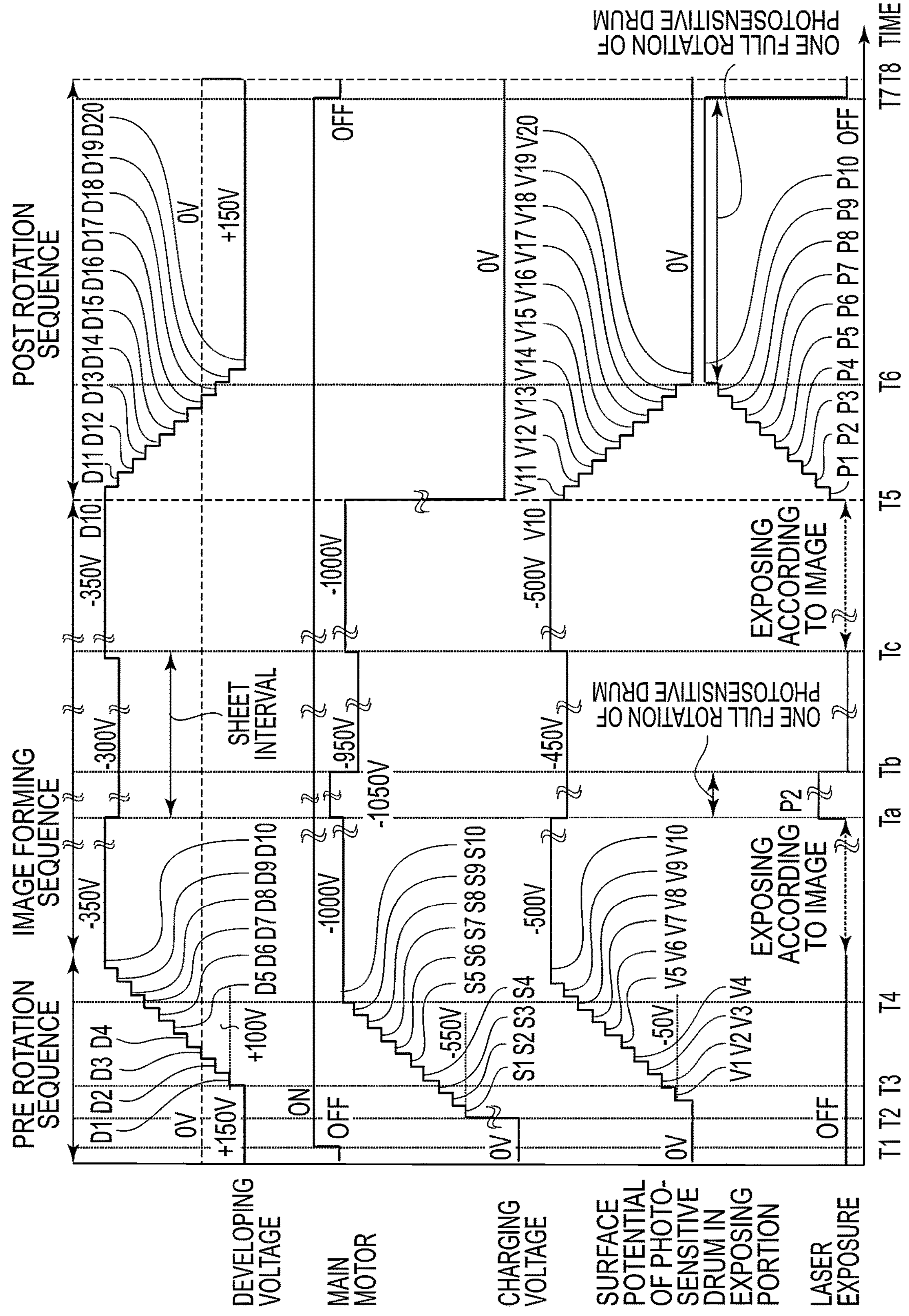
FIG. 14 is a timing chart showing the print sequence according to embodiment 6.

First, the control of the present embodiment is explained. FIG. 14 is a timing chart explaining the relationship between the developing voltage, charging voltage, main motor driving each roller, surface potential of the photosensitive drum 1, and the quantity of laser light irradiated to the photosensitive drum 1 in the print sequence of the present embodiment. In FIG. 14, the horizontal axis indicates time, and T1 to T8, Ta, Tb, and Tc indicate timing (time). In FIG. 14, the control in the pre-rotation sequence and post-rotation sequence is the same as the control shown in FIG. 4 of embodiment 1 above, and the explanation is omitted here.

In the present embodiment, the same exposure control as the first exposure in embodiment 4 is performed during the period in the image forming sequence when image forming is not taking place between the preceding and subsequent paper (hereinafter referred to as "paper interval"). In FIG. 14, the period from timing Ta to timing Tc is the paper interval. This section describes the present embodiment exposure control in the paper interval when the paper interval is longer than the time required for the photosensitive drum 1 to make one revolution. As shown in FIG. 14, the surface potential of the photosensitive drum 1 during image formation is −500 V, as in embodiment 4. Then, at timing Ta, the charging voltage is increased to −1050 V to lower the surface potential of the photosensitive drum 1 during the subsequent paper interval, and the surface of the photosensitive drum 1 is exposed with a second exposure quantity P2 similar to the first exposure in embodiment 1. As a result, the surface potential of the photosensitive drum 1 is lowered from −550V to −450V. At this time, it is more suitable to set the developing voltage from −350V to −300V along with the lowering of the surface potential of the photosensitive drum 1, because the Vback can be the same as during image formation.

Furthermore, during the period from timing Tb to timing Tc, which exceeds the time for the photosensitive drum 1 to complete one revolution, the charging voltage supplied from the charging voltage power source 52 is switched from −1050V to −950V without any exposure by laser light. This allows the surface potential of the photosensitive drum 1 to be maintained at −450V. After timing Tc, the charging voltage supplied from the charging voltage power source 52 is switched from −950V to −1,000V in accordance with the timing of image formation, so that the surface potential of the photosensitive drum 1 during image formation can be restored from −450V to −500V. Furthermore, the developing voltage is also restored from −300V to −350V at timing Tc, if it was set at −300V during paper interval.

The effects of the present embodiment are the same as in embodiment 5 above, and therefore, the explanation is omitted. In each of the above-mentioned embodiments, a monochrome image forming apparatus was used to explain the present invention. However, the present invention is not limited to monochrome image forming apparatus, but can also be applied to image forming apparatuses such as tandem-type color image forming apparatus using a recording material feeding belt and color image forming apparatus using an intermediate transfer belt.

In embodiment 1, the method of performing laser exposures such as the first exposure after setting the charging voltage to 0 V at timing T5, when switching from the image forming sequence to the post-rotation sequence, is described. Even if the charging voltage is maintained at −500 V until timing T6, when the 10th exposure, which exposes one revolution of the photosensitive drum 1, is started, and the charging voltage is set to 0 V at timing T6, the surface potential of the photosensitive drum 1 can be set to V11 to V20 by the exposure method described above.

Figure 15:
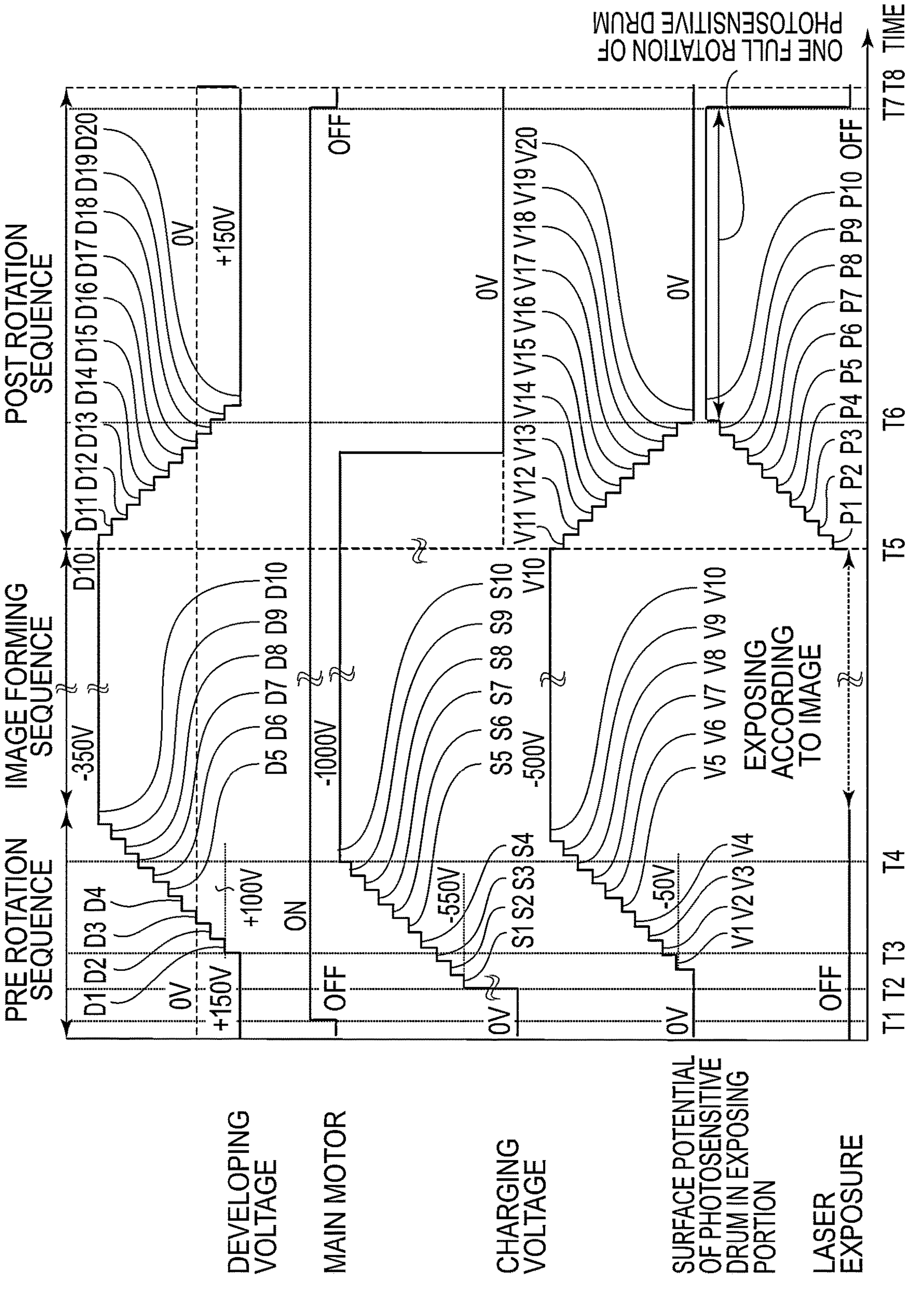
FIG. 15 is a timing chart illustrating the print sequence according to other embodiments.

FIG. 15 is a timing chart explaining the relationship between the developing voltage, charging voltage, main motor, surface potential of the photosensitive drum 1, and laser light quantity irradiated to the photosensitive drum 1 in a print sequence in which the timing for setting the charging voltage to 0 V is shifted later than in embodiment 1. In FIG. 15, the horizontal axis indicates time, and T1 to T8 indicate timing (time). In FIG. 15, the solid line showing the voltage change of the charging voltage is the timing chart when the timing for setting the charging voltage to 0 V is shifted later than in embodiment 1. On the other hand, the timing chart shown by the dotted line shows the change in the charging voltage shown in FIG. 4 of embodiment 1. As shown in FIG. 15, the charging voltage can be switched to 0 V at any timing between timing T5 and timing T6 to achieve the same effect as in embodiment 1.

As explained above, the present embodiment can suppress the generation of blurring during non-image formation when no toner image is formed on the photosensitive drum.

According to the present invention, it is possible to suppress the generation of blurring during non-image formation when no toner image is formed on the photosensitive drum.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-015479, filed on Feb. 3, 2022, which is hereby incorporated by reference herein in its entirety.

What is claimed is:

1. An image forming apparatus comprising:

a rotatable photosensitive member;

a charging member configured to charge a surface of the photosensitive member;

an exposing unit configured to expose the surface of the photosensitive member for forming an electrostatic latent image on the surface of the photosensitive member charged by the charging member;

a developing member configured to supply toner with normal polarity to the photosensitive member in a developing portion opposed to the photosensitive member and form a toner image;

a developing voltage source configured to apply a developing voltage to the developing member; and a control portion configured to control the exposing unit and the developing voltage source, wherein the control portion controls an image forming operation for forming the toner image on the surface of the photosensitive member and a non-image forming operation, in which the toner image is not formed on the surface of the photosensitive member, different from the image forming operation so as to be executable, wherein, during the non-image forming operation, in a case in which the control portion causes the surface potential of the photosensitive member formed on an area of the photosensitive member by the exposing unit to be changed from a first surface potential to a second surface potential smaller than an absolute value of the first surface potential, the control portion controls the developing voltage source such that the developing voltage is changed by applying the first developing voltage while the area of the photosensitive member on which the first surface potential is formed passes through the developing portion and by applying a second developing voltage which is smaller than an absolute value of the first developing voltage while the area of the photosensitive member on which the second surface potential is formed passes through the developing portion, and the control portion controls the exposure unit so that a first exposure amount for exposing the surface of the photosensitive drum when forming the second surface potential in the non-image forming operation is larger than a second exposure amount for exposing the surface of the photosensitive drum to form the electrostatic latent image in the image forming operation.

2. An image forming apparatus according to claim 1, wherein the control portion, during the non-image forming operation, controls the exposing unit by causing the surface potential of the photosensitive member to be stepwise changed to a predetermined potential of the opposite polarity side and controls the developing voltage source by causing the developing voltage to be stepwise changed to a predetermined developing voltage of the opposite polarity side such that the potential difference is maintained at a predetermined value.

3. An image forming apparatus according to claim 1, wherein the developing member is disposed in contact with the photosensitive member.

* * * * *